(12) United States Patent
Kobayashi et al.

(10) Patent No.: US 11,634,189 B2
(45) Date of Patent: Apr. 25, 2023

(54) BATTERY ARRANGEMENT STRUCTURE AND SADDLE-RIDING TYPE VEHICLE

(71) Applicant: HONDA MOTOR CO., LTD., Tokyo (JP)

(72) Inventors: Yoshitaka Kobayashi, Wako (JP); Katsuyuki Okubo, Wako (JP); Akira Kuramochi, Wako (JP); Kazuo Tsuji, Wako (JP); Toshifumi Shimamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 16/642,915

(22) PCT Filed: Sep. 29, 2017

(86) PCT No.: PCT/JP2017/035484
§ 371 (c)(1),
(2) Date: Feb. 28, 2020

(87) PCT Pub. No.: WO2019/064493
PCT Pub. Date: Apr. 4, 2019

(65) Prior Publication Data
US 2020/0339207 A1 Oct. 29, 2020

(51) Int. Cl.
*B62J 43/28* (2020.01)
*B62J 43/23* (2020.01)
(Continued)

(52) U.S. Cl.
CPC ............... *B62J 43/28* (2020.02); *B62J 43/16* (2020.02); *B62J 43/20* (2020.02); *B62J 43/23* (2020.02);
(Continued)

(58) Field of Classification Search
CPC ..................................................... B62J 43/23
See application file for complete search history.

(56) References Cited

U.S. PATENT DOCUMENTS

| 2006/0066092 | A1  | 3/2006 | Miyabe |
| 2010/0078236 | A1* | 4/2010 | Sasage .................. B62K 11/10 |
|              |     |        | 180/65.51 |

(Continued)

FOREIGN PATENT DOCUMENTS

| CN | 1640756 | 7/2005 |
| CN | 102464071 | 5/2012 |

(Continued)

OTHER PUBLICATIONS

International Search Report and Written Opinion for International Application No. PCT/JP2017/035484 dated Dec. 5, 2017, 8 pages.

(Continued)

*Primary Examiner* — Daniel L Greene
(74) *Attorney, Agent, or Firm* — Amin, Turocy & Watson, LLP

(57) ABSTRACT

Various battery arrangement structures are presented for a saddle-riding type vehicle. An arrangement can be configured to protect a battery from external impact, and can include a pair of left and right rear frames disposed at the rear section of the vehicle with a battery disposed between the pair of left and right rear frames. The pair of left and right rear frames include a pair of left and right first rear frames and a pair of left and right second rear frames. A power unit-supporting portion which swingably supports a power unit is provided at rear portions of the pair of left and right rear extension portions, and the battery is disposed between the pair of left and right second rear frames and above the power unit-supporting portion.

12 Claims, 10 Drawing Sheets

(51) Int. Cl.
*B62J 43/16* (2020.01)
*B62J 43/20* (2020.01)
*B62K 11/10* (2006.01)
*B62K 25/04* (2006.01)

(52) U.S. Cl.
CPC .............. *B62K 11/10* (2013.01); *B62K 25/04* (2013.01); *B62K 2204/00* (2013.01)

(56) References Cited

U.S. PATENT DOCUMENTS

| | | | |
|---|---|---|---|
| 2010/0078246 A1* | 4/2010 | Sasage | B60L 3/0046 180/220 |
| 2010/0078249 A1 | 4/2010 | Nishiura et al. | |
| 2012/0175906 A1* | 7/2012 | Hiwatashi | B62K 19/46 296/37.1 |
| 2012/0247859 A1* | 10/2012 | Kawaguchi | B62M 6/65 180/220 |
| 2012/0325571 A1 | 12/2012 | Nomura et al. | |
| 2015/0075888 A1* | 3/2015 | Duncan | B62K 25/283 180/219 |
| 2015/0123611 A1* | 5/2015 | Huang | B62J 43/16 320/109 |
| 2015/0344093 A1* | 12/2015 | Inoue | B62J 43/28 180/220 |

FOREIGN PATENT DOCUMENTS

| | | |
|---|---|---|
| CN | 102556240 | 7/2012 |
| CN | 102582742 | 7/2012 |
| CN | 103009998 | 4/2013 |
| CN | 103085920 | 5/2013 |
| CN | 103359232 | 10/2013 |
| CN | 104925187 | 9/2015 |
| CN | 205087091 | 3/2016 |
| CN | 205087091 U * | 3/2016 |
| EP | 2623404 | 8/2013 |
| EP | 2634075 | 9/2013 |
| EP | 2955088 | 12/2015 |
| EP | 2423087 | 5/2016 |
| JP | 06-321152 | 11/1994 |
| JP | 08-067283 | 3/1996 |
| JP | 2003-127956 | 5/2003 |
| JP | 2008-247166 | 10/2008 |
| JP | 2009-040309 | 2/2009 |
| JP | 2010-083371 | 4/2010 |
| JP | 2011-152901 | 8/2011 |
| JP | 2013-129337 | 7/2013 |
| WO | 2012/043518 | 4/2012 |
| WO | 2013/180199 | 12/2013 |

OTHER PUBLICATIONS

Chinese Notice of Allowance for Chinese Patent Application No. 201780095249.7 dated Nov. 3, 2021, 8 Pages.
Chinese Office Action for Chinese Patent Application No. 201780095249.7 dated Aug. 2, 2021, 22 Pages.
Chinese Office Action for Chinese Patent Application No. 201780095249.7 dated Jan. 19, 2021, 20 Pages.

* cited by examiner

BATTERY ARRANGEMENT STRUCTURE AND SADDLE-RIDING TYPE VEHICLE

TECHNICAL FIELD

The present invention relates to a battery arrangement structure and a saddle-riding type vehicle.

BACKGROUND ART

A conventional example of a saddle-riding type vehicle is disclosed in Patent Literature 1. In it, a single battery is arranged between a pair of left and right back stays extending rearward and upward from extension end portions of a down tube.

CITATION LIST

Patent Literature

[Patent Literature 1]
Japanese Patent Application, Publication No. 2003-127956

SUMMARY OF INVENTION

Technical Problem

On the other hand, in saddle-riding type vehicles, in the case of arranging an accommodating section and a battery, it is necessary to protect the accommodating section and the battery from external factors such as an external impact in a limited space. In particular, in the case of arranging the battery at a rear part of the vehicle, it is necessary to consider the feasibility of a layout with peripheral components such as a rear wheel.

An object of an aspect of the present invention is to provide a battery arrangement structure and a saddle-riding type vehicle in which feasibility of a layout with peripheral components can be satisfied while an accommodating section and a battery are protected.

Solution to Problem

One embodiment of the present invention is a battery arrangement structure (100A) which is characterized by including a pair of left and right rear frames (140) disposed in a rear section of a vehicle (1), and a battery (102) disposed between the pair of left and right rear frames (140), the pair of left and right rear frames (140) including a pair of left and right first rear frames (145) extending upward from a lower portion of the vehicle (1), and a pair of left and right second rear frames (15) extending rearward from upper end portions of the pair of left and right first rear frames (145), the battery arrangement structure (100A) further including a pair of left and right rear extension portions (172) extending rearward from lower sides of the pair of left and right first rear frames (145), and an accommodating section (103) disposed between the pair of left and right first rear frames (145), in which a power unit-supporting portion (173) which swingably supports a power unit (10) is provided at rear portions of the pair of left and right rear extension portions (172), and the battery (102) is disposed between the pair of left and right second rear frames (15) and above the power unit-supporting portion (173).

According to this configuration, since the accommodating section is disposed between the pair of left and right first rear frames, the accommodating section can be protected from external factors from outside in a vehicle width direction. In addition, since the battery is disposed between the pair of left and right second rear frames, the battery can be protected from external factors from outside in the vehicle width direction. In addition, since the battery is disposed above the power unit-supporting portion, the battery is far away from a rear wheel positioned behind the power unit-supporting portion, and thus the feasibility of a layout with peripheral parts such as a rear wheel can be satisfied. Therefore, the feasibility of the layout with the peripheral components can be satisfied while the accommodating section and the battery are protected.

In one aspect of the present invention, the pair of left and right rear frames (140) further include a pair of left and right third rear frames (16) extending rearward from vertically intermediate portions of the pair of left and right first rear frames (145), the pair of left and right second rear frames (15) overlap an upper portion of the accommodating section (103) and an upper portion of the battery (102) in a side view, and the pair of left and right third rear frames (16) overlap a vertically intermediate portion of the accommodating section (103) and a vertically intermediate portion of the battery (102) in a side view.

According to this configuration, the upper portion of the accommodating section and the upper portion of the battery can be protected from external factors from outside in the vehicle width direction by the pair of left and right second rear frames. In addition, the vertically intermediate portion of the accommodating section and the vertically intermediate portion of the battery can be protected from external factors from outside in the vehicle width direction by the pair of left and right third rear frames. Therefore, the accommodating section and the battery can be more effectively protected.

One aspect of the present invention is characterized by further including a pair of left and right battery-supporting portions (108) extending rearward from lower portions of the pair of left and right first rear frames (145), in which the pair of left and right battery-supporting portions (108) are disposed below the accommodating section (103) and the battery (102).

According to this configuration, since the pair of left and right battery-supporting portions can be disposed in a vertical dead space between the accommodating section and the battery and the rear extension portions, this is suitable for satisfying the feasibility of the layout with peripheral components.

In one aspect of the present invention, the pair of left and right second rear frames (15) include front extension portions (151) extending forward from upper end portions of the pair of left and right first rear frames (145), and the front extension portions (151) overlap the vertically intermediate portion of the accommodating section (103) in a side view.

According to this configuration, the vertically intermediate portion of the accommodating section can be protected from external factors from the outside in the vehicle width direction by the pair of left and right front extension portions. Therefore, the accommodating section can be protected more effectively.

One aspect of the present invention is characterized in that the accommodating section (103) and the battery (102) are obliquely disposed to be positioned further rearward as they go upward in a side view.

According to this configuration, since upper end positions of the accommodating section and the battery can be lower compared with the case in which the accommodating section and the battery are disposed in a vertical direction thereof, a seat height can be kept as low as possible. In addition, a fender arrangement space is easily secured between the battery and the rear wheel in a longitudinal direction thereof.

One aspect of the present invention is characterized in that a lower rear end (H2) of the battery (102) is disposed above a lower rear end (H1) of the accommodating section (103) in a side view, and an upper rear end (H5) of the battery (102) is disposed below upper edges (15e) of the second rear frames (15) in a side view.

According to this configuration, since the upper end positions of the accommodating section and the battery can be lowered as compared with the case in which the upper rear end of the battery is disposed above the upper edges of the second rear frames, the seat height can be kept as low as possible.

One aspect of the present invention is characterized in that an upper front end (H4) of the battery (102) is disposed below the upper edges (15e) of the second rear frames (15) in a side view.

According to this configuration, since the upper end positions of the accommodating section and the battery can be lowered as compared with the case in which the upper front end of the battery is disposed above the upper edges of the second rear frames, the seat height can be kept as low as possible.

One aspect of the present invention is characterized in that the pair of left and right first rear frames (145) overlap a rear portion of the accommodating section (103) from a lower portion to an upper portion of the accommodating section (103) in a side view.

According to this configuration, the rear portion of the accommodating section can be protected from external factors from the outside in the vehicle width direction by the pair of left and right first rear frames. Therefore, the accommodating section can be protected more effectively.

One aspect of the present invention is characterized in that a pivot shaft (189) extending in a vehicle width direction is provided in the power unit-supporting portion (173), and the accommodating section (103) and the battery (102) are disposed inward in the vehicle width direction from both ends of the pivot shaft (189).

According to this configuration, the accommodating section and the battery can be protected from external factors from the outside in the vehicle width direction by both ends of the pivot shaft. Therefore, the accommodating section and the battery can be more effectively protected.

One aspect of the present invention is characterized in that a second battery (101) positioned in front of the battery (102) is further provided, and the accommodating section (103) is a battery-accommodating section which accommodates the second battery (101).

According to this configuration, the second battery can be protected from external factors by the accommodating section. Therefore, it is possible to satisfy the feasibility of the layout with peripheral components while protecting the plurality of batteries. In addition, since the accommodating section is disposed between the pair of left and right first rear frames, the second battery can be protected from external factors from the outside in the vehicle width direction. Therefore, the protective effect of the pair of left and right first rear frames and the protective effect of the accommodating section are combined, so that the second battery can be more effectively protected.

One aspect of the present invention is characterized in that the battery (102) and the second battery (101) are mobile batteries that are detachable from the vehicle (1). According to this configuration, it is possible to satisfy the feasibility of the layout with peripheral components while protecting the plurality of mobile batteries. In addition, when the battery and the second battery are obliquely disposed to be positioned further rearward as they go upward in a side view, attaching and detaching characteristics of the battery and the second battery with respect to the vehicle can be improved as compared with the case in which the battery and the second battery are disposed vertically.

One aspect of the present invention is characterized in that a saddle-riding type vehicle includes the battery arrangement structure (100A) described above.

According to this configuration, it is possible to provide a saddle-riding type vehicle having a battery arrangement structure in which it is possible to satisfy the feasibility of the layout with peripheral components while protecting the accommodating section and the battery.

Advantageous Effects of Invention

According to the aspects of the present invention, it is possible to satisfy the feasibility of layout with peripheral components while protecting the accommodating section and the battery.

DESCRIPTION OF EMBODIMENTS

Figure 1:
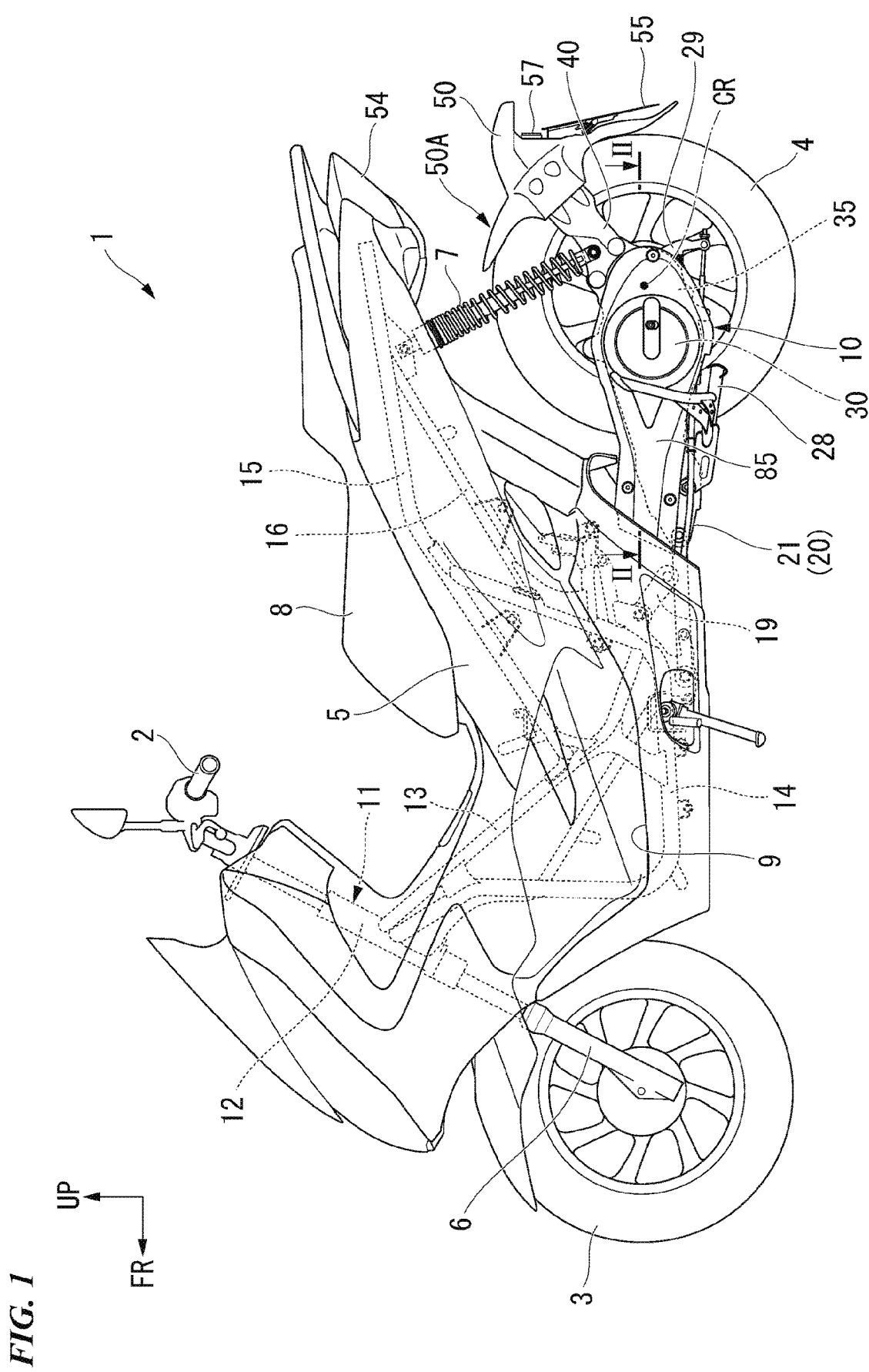
FIG. 1 is a left side view of a motorcycle according to an embodiment.

Hereinafter, an embodiment of the present invention will be described with reference to the drawings. Directions such as forward, rearward, leftward and rightward in the following description are the same as those in the vehicle described below unless otherwise specified. At appropriate places in the drawings used for the following description, an arrow FR indicating forward in the vehicle, an arrow LH indicating leftward in the vehicle, and an arrow UP indicating upward in the vehicle are shown.

<Entire Vehicle>

FIG. 1 shows a unit swing type motorcycle 1 as an example of a saddle-riding type vehicle. Referring to FIG. 1, the motorcycle 1 includes a front wheel 3 steered by a handlebar 2 and a rear wheel 4 driven by a power unit 10 including a power source. Hereinafter, the motorcycle may be simply referred to as a "vehicle." The motorcycle 1 of the embodiment is a scooter-type vehicle having a step floor 9 on which an occupant seated on a seat 8 places his or her feet.

Steering system components including the handlebar 2 and the front wheel 3 are pivotally supported to be steerable by a head pipe 12 at a front end of a vehicle body frame 11. An outer periphery of the vehicle body frame 11 is covered with a vehicle body cover 5. In FIG. 1, a reference numeral 6 denotes front forks.

The vehicle body frame 11 is formed by integrally joining steel material pieces of a plurality of types using welding or the like. The vehicle body frame 11 includes the head pipe 12 positioned at a front end portion of the vehicle body frame 11, a pair of left and right upper frames 13 extending obliquely rearward and downward from the head pipe 12, a pair of left and right down frames 14 which extend obliquely rearward and downward from a lower portion of the head pipe 12 at steeper angles than the left and right upper frames 13 and extend substantially horizontally rearward from lower ends thereof, and then extend obliquely rearward and upward from rear ends thereof, a pair of left and right rear upper frames 15 which extend obliquely rearward and upward from vertically intermediate portions of the left and right upper frames 13 to be connected to rear upper ends of the left and right down frames 14 and extend obliquely rearward and upward from the connected portions, and rear lower frames 16 which extend obliquely rearward and upward from rear portions of the down frames 14 and are connected to rear portions of the rear upper frames 15.

<Power Unit>

The power unit 10 is a swing type power unit in which a motor 30 serving as a drive source disposed on a left side of the rear wheel 4, a power transmission mechanism 35 which can drive the rear wheel 4 with power obtained from the motor 30, and a swing frame 20 which supports the motor 30 and the power transmission mechanism 35 are integrated.

An axle 4a of the rear wheel 4 (hereinafter, also referred to as a "rear wheel axle 4a"; see FIG. 2) is provided at a rear end portion of the power unit 10. The power obtained from the motor 30 is transmitted to the rear wheel axle 4a (see FIG. 2) via the power transmission mechanism 35, so that the rear wheel 4 supported on the rear wheel axle 4a is driven and the vehicle travels. A reference sign CR in the figure indicates a central axis (a rear wheel axis) of the rear wheel axle 4a, which is an axis parallel to a vehicle width direction.

A lower front portion of the power unit 10 is supported at a lower rear side of the vehicle body frame 11 via a link mechanism 19 to be vertically swingable. A pair of left and right rear cushions 7 for attenuating a swing of the power unit 10 are stretched between a rear end of the power unit 10 and a seat frame 15. Hereinafter, in the vehicle, components on a left side in the vehicle width direction may be denoted by "L" and components on a right side in the vehicle width direction may be denoted by "R."

<Swing Frame>

Figure 2:
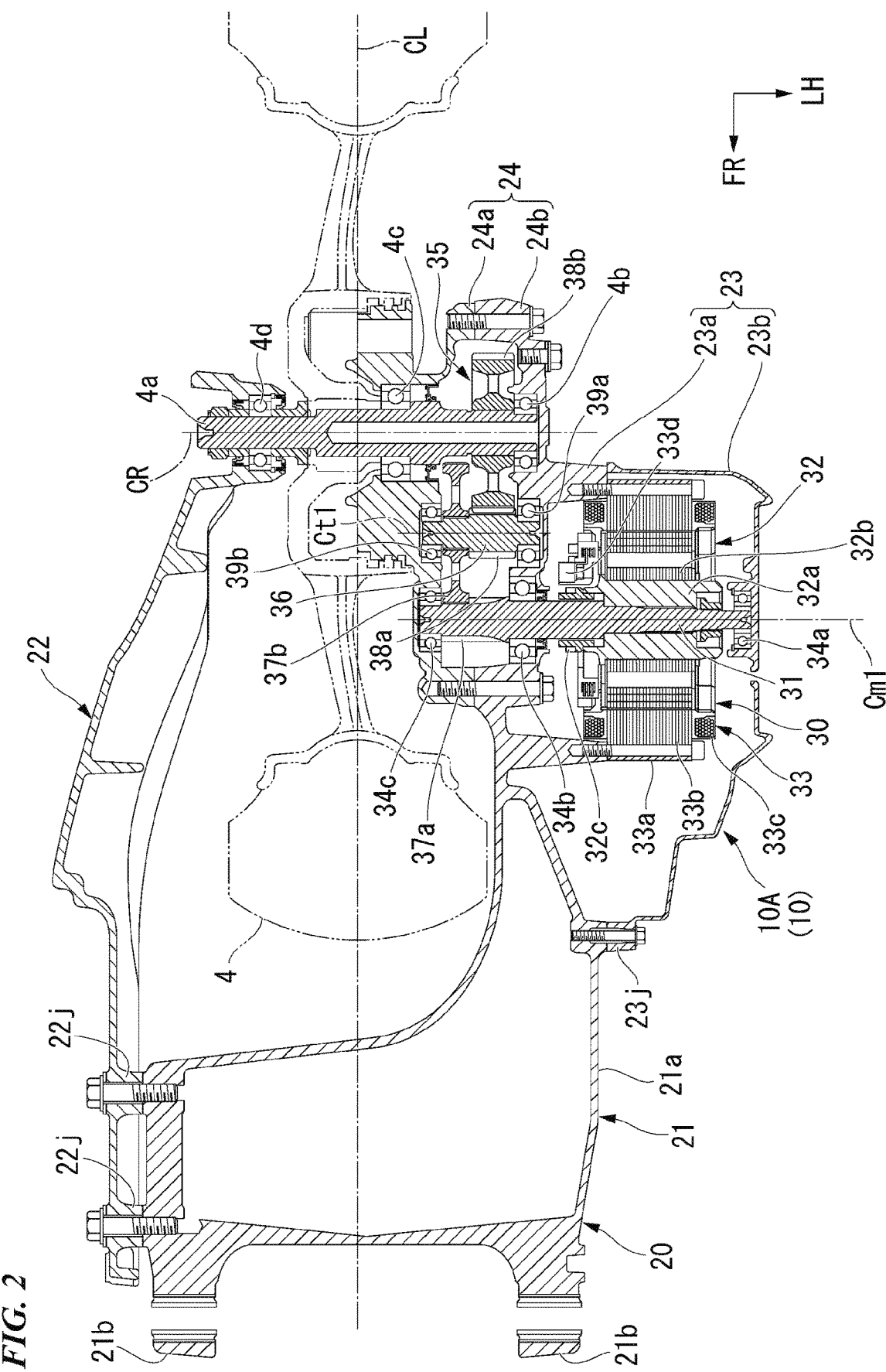
FIG. 2 is a diagram including a cross-section II-II of FIG. 1.

As shown in FIG. 2, the swing frame 20 includes a main arm 21 extending from a front side of the rear wheel 4 toward a left side of the rear wheel 4, and a sub-arm 22 extending from a front right side of the main arm 21 toward a right side of the rear wheel 4 while curving inward in the vehicle width direction. Reference sign CL in the figure indicates a lateral center line of a vehicle body.

<Main Arm>

The main arm 21 is provided with a power-accommodating section 23 accommodating the motor 30 and a transmission-accommodating section 24 accommodating the power transmission mechanism 35.

<Power-Accommodating Section>

The power-accommodating section 23 includes an inner cover 23a which covers the motor 30 from an inner side thereof in the vehicle width direction, and an outer cover 23b which covers the motor 30 from an outer side thereof in the vehicle width direction.

The inner cover 23a has a box shape that opens outward in the vehicle width direction. The inner cover 23a is integrally formed of the same member as an arm section 21a of the main arm 21.

The outer cover 23b has a box shape that opens inward in the vehicle width direction. The outer cover 23b is coupled to the inner cover 23a using fastening members such as bolts.

<Arm Section>

Figure 3:
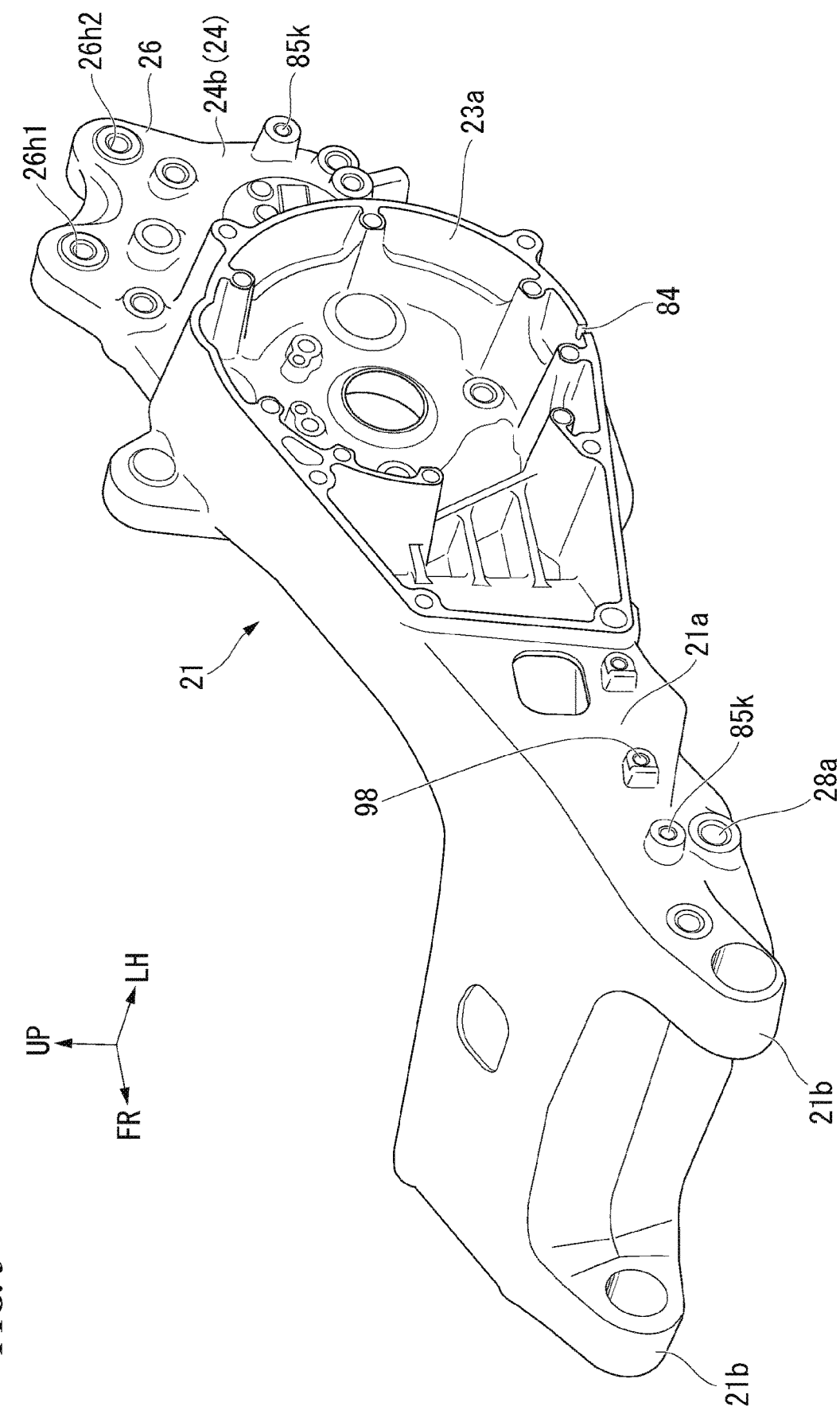
FIG. 3 is a perspective view of a main arm according to the embodiment from an upper left side.

As shown in FIG. 2, the main arm 21 is provided with the arm section 21a extending forward from the power-accommodating section 23. As shown in FIG. 3, the arm section 21a extends in a front to rear direction of the vehicle to be continuous with the inner cover 23a. In FIG. 3, reference numeral 21b indicates a pair of left and right front extension portions extending forward from a front end portion of the arm section 21a.

<Transmission-Accommodating Section>

As shown in FIG. 2, the transmission-accommodating section 24 includes an inner case 24a disposed on a left side of the rear wheel 4 on the inner side in the vehicle width direction, and an outer case 24b that covers the inner case 24a from an outer side in the vehicle width direction.

The inner case 24a has a box shape that opens outward in the vehicle width direction.

The outer case 24b has a box shape that opens inward in the vehicle width direction. The outer case 24b is integrally formed of the same member as the inner cover 23a of the main arm 21. The outer case 24b is coupled to the inner case 24a using fastening members such as bolts.

Figure 4:
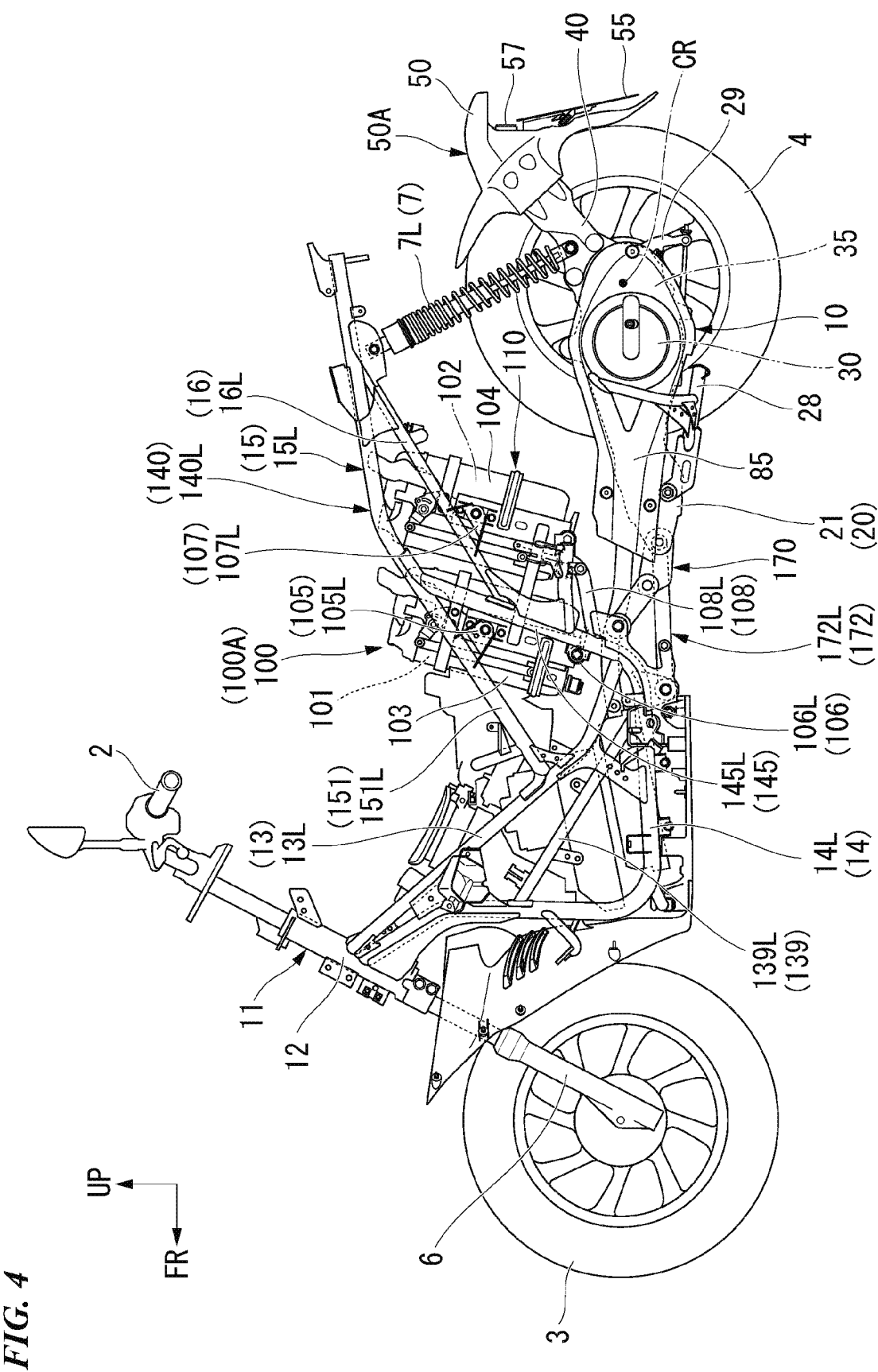
FIG. 4 is a diagram in which a vehicle body cover and the like in FIG. 1 are removed.

As shown in FIG. 3, the transmission-accommodating section 24 is provided with a fender stay-supporting portion 26 that protrudes rearward and upward to support a fender stay 40 (see FIG. 4). As shown in FIG. 4, the fender stay 40 extends rearward and upward from a vicinity of the rear wheel axle 4a (see FIG. 2) and supports a fender 50 disposed above and behind the rear wheel. In FIG. 4, reference numeral 28 indicates a center stand (hereinafter, also simply referred to as a "stand") and reference numeral 29 indicates a rear brake. In FIG. 3, reference numeral 28a indicates a stand-engaging portion with which the stand rotatably engages.

<Motor>

As shown in FIG. 2, the motor 30 is disposed on the left side of the rear wheel 4. The motor 30 is an inner rotor type motor. The motor 30 includes a motor output shaft 31, an inner rotor 32, and a stator 33.

The motor output shaft 31 is supported by the main arm 21 in the vehicle width direction. The motor output shaft 31 has an axis $Cm1$ (hereinafter, also referred to as a "motor axis $Cm1$") parallel to a rear wheel axis CR. Reference numerals 34a to 34c in the figure indicate bearings that rotatably support the motor output shaft 31.

The inner rotor 32 includes an inner rotor body 32a having a cylindrical shape and magnets 32b provided on an outer circumferential surface of the inner rotor body 32a. A radially central portion of the inner rotor body 32a is spline-coupled to the motor output shaft 31. A detection target 32c is attached to an outer circumferential surface of an inner end portion of the inner rotor body 32a in the vehicle width direction.

The stator 33 includes an annular stator yoke 33a fixed to an outer circumferential wall of the inner cover 23a, a plurality of teeth 33b which are joined to the stator yoke 33a and are provided radially with respect to the motor axis Cm1, and a coil 33c in which a conductive wire is wound around the teeth 33b. A rotor sensor 33d for detecting the detection target 32c is attached to the stator yoke 33a.

A battery 100 (see FIG. 4) is connected to the motor 30. The battery 100 supplies electric power to the motor 30 when the motor 30 drives the rear wheel 4. Also, control of the motor 30 is performed by a control unit (not shown).

<Power Transmission Mechanism>

As shown in FIG. 2, the power transmission mechanism 35 is disposed on the left side of the rear wheel 4. The power transmission mechanism 35 is provided in the transmission-accommodating section 24 continuous with the power-accommodating section 23.

The power transmission mechanism 35 includes a transmission shaft 36 supported parallel to the motor output shaft 31 and the rear wheel axle 4a, a pair of first gears 37a and 37b which are provided respectively at an inner end portion of the motor output shaft 31 in the vehicle width direction and at an inner portion of the transmission shaft 36 in the vehicle width direction, and a pair of second gears 38a and 38b which are provided respectively at an outer portion of the transmission shaft 36 in the vehicle width direction and at a left end portion of the rear wheel axle 4a. Reference numerals 4b to 4d in the figure indicate bearings that rotatably support the rear wheel axle 4a.

The motor output shaft 31, the transmission shaft 36, and the rear wheel axle 4a are disposed at intervals in that order from the front side in the longitudinal direction. The transmission shaft 36 has an axis Ct1 (hereinafter, also referred to as a "transmission axis Ct1") parallel to the motor axis Cm1. Reference numerals 39a and 39b in the figure indicate bearings that rotatably support the transmission shaft 36.

With this configuration, rotation of the motor output shaft 31 is reduced at a predetermined reduction ratio and transmitted to the rear wheel axle 4a.

<Control Unit>

Although not shown, the control unit performs overall control of the motor 30. For example, the control unit includes a central processing unit (CPU), a read-only memory (ROM), a random-access memory (RAM), and the like. The control unit receives information from a throttle opening sensor (not shown) or the like and outputs a predetermined control signal to a driver of the motor 30.

<Sub-Arm>

As shown in FIG. 2, the sub-arm 22 extends in the longitudinal direction on the right side of the rear wheel 4. A front end portion of the sub-arm 22 is coupled to a right side of a front section of the main arm 21 using fastening members such as bolts. In FIG. 2, reference numeral 22j indicates a coupling portion between the sub-arm 22 and the main arm 21. Although not shown, a right cushion-supporting stay that projects upward and rearward and supports a right rear cushion is provided at a rear end portion of the sub-arm 22.

<Fender Structure>

As shown in FIG. 1, a fender structure 50A that supports the fender 50 disposed above and behind the rear wheel 4 with the fender stay 40 extending rearward from a vicinity of the rear wheel axle 4a (see FIG. 2) is provided on a rear side of the vehicle. The fender structure 50A has a cantilevered structure in which only a left portion of the fender 50 is fixed to the fender stay 40.

Figure 5:
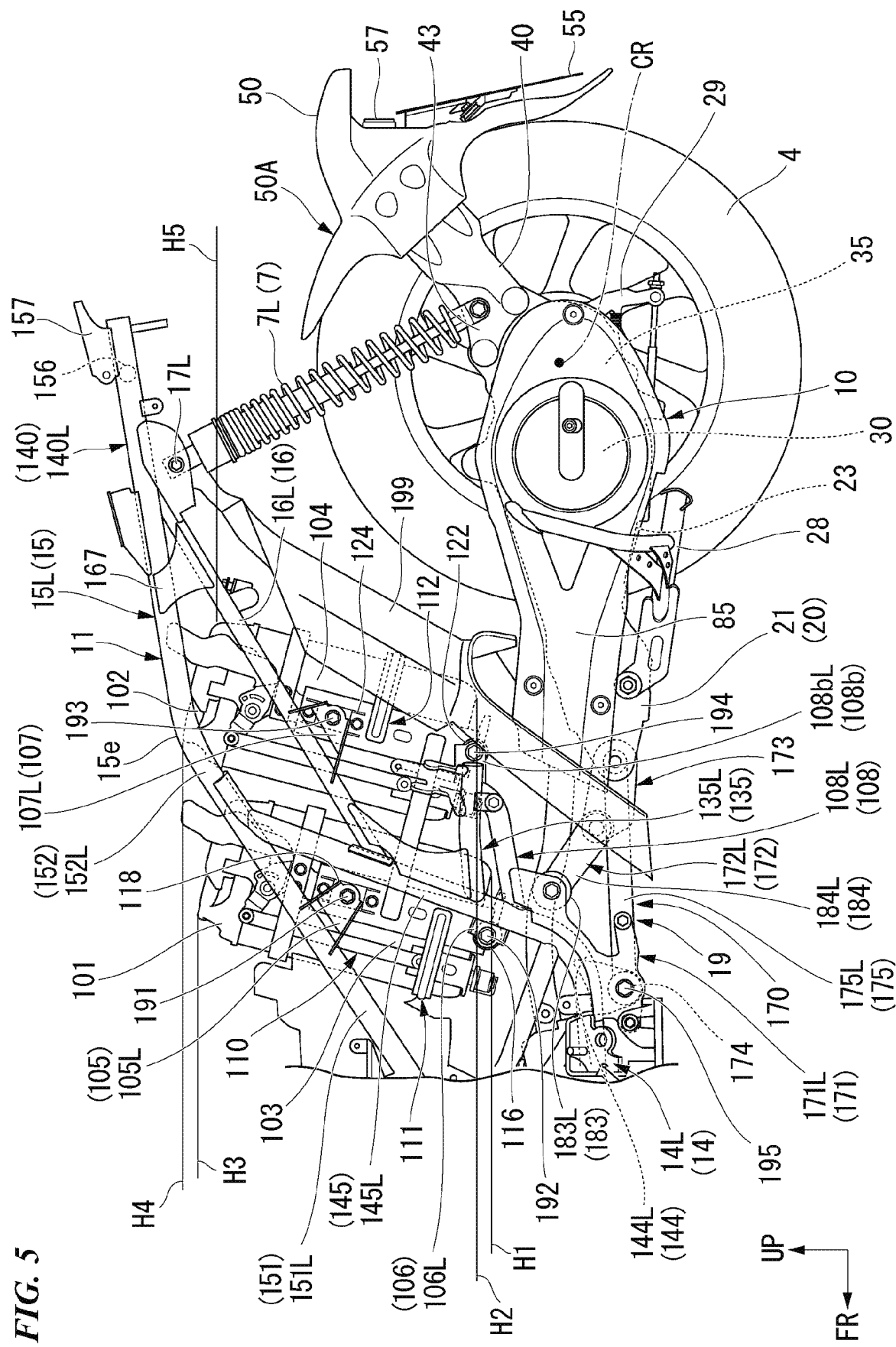
FIG. 5 is a left side view of a battery arrangement structure according to the embodiment.

As shown in FIG. 5, the fender structure 50A includes the fender stay 40 and the fender 50. The fender stay 40 is provided with a left cushion supporting portion 43 (a rear wheel suspension supporting portion) that supports a left rear cushion 7L. In FIG. 5, reference numeral 85 indicates a protective cover that covers the power-accommodating section 23 from an outer side in the vehicle width direction.

In FIG. 1, reference numeral 54 indicates a tail lamp. The fender stay 40 and the fender 50 overlap the tail lamp 54 in a vertical direction of the vehicle. In the side view of FIG. 1, a front end portion of the fender 50 extends toward a space between a lower end of the tail lamp 54 and the rear cushion 7. In the side view of FIG. 1, the front end portion of the fender 50 is close to the rear cushion 7.

In FIG. 3, reference numerals 26h1 and 26h2 indicate a plurality of through-holes that open in the vehicle width direction so that stem portions of bolts can be inserted, reference numeral 85k indicates a coupling portion of the main arm 21 or the like with a protective cover 85 (see FIG. 1), and reference numeral 98 indicates a female screw portion provided on the arm section 21a.

<Battery>

As shown in FIG. 4, a battery 100 for supplying electric power to the motor 30 is mounted below the seat 8 (see FIG. 1). The battery 100 includes two front and rear unit batteries 101 and 102. The unit batteries 101 and 102 have the same configuration. Each of the unit batteries 101 and 102 has a rectangular parallelepiped shape which has a square cross-section and extends in a longitudinal direction thereof. The unit batteries 101 and 102 are mobile batteries that are detachable from the vehicle body. The front and rear unit batteries 101 and 102 are inclined parallel to each other, and are disposed with a space between respective rear and front surfaces thereof.

The battery 100 generates a predetermined high voltage (for example, 48 V to 72 V) by connecting a plurality of unit batteries 101 and 102 in series. For example, each of the unit batteries 101 and 102 is configured of a lithium ion battery as an energy storage that can be charged and discharged. The unit batteries 101 and 102 are inserted into and removed from respective battery cases 103 and 104 fixed to the vehicle body (case-supporting structures 110) from above. As shown in FIG. 5, the case-supporting structure 110 that supports each of the battery cases 103 and 104 is attached to the vehicle body frame 11.

Although not shown, the battery cases 103 and 104 are provided with battery insertion and removal openings that open upward. The unit batteries 101 and 102 slide obliquely from the battery insertion and removal openings into the battery cases 103 and 104, thereby being accommodated in the battery cases 103 and 104 to be able to be put in and taken out. The unit batteries 101 and 102 are obliquely inserted into and removed from the battery cases 103 and 104, and thus some of weights of the unit batteries 101 and 102 are supported by wall portions of the battery cases 103 and 104.

Hereinafter, below the seat 8 (see FIG. 1), the unit battery 101 (a second battery) positioned forward is also referred to as a "front battery 101," and the unit battery 102 (a battery) positioned rearward is also referred to as a "rear battery 102." Hereinafter, the battery case 103 that accommodates the front battery 101 is also referred to as a "front case 103,"

and the battery case 104 that accommodates the rear battery 102 is also referred to as a "rear case 104."

<Case-Supporting Structure>

Figure 6:
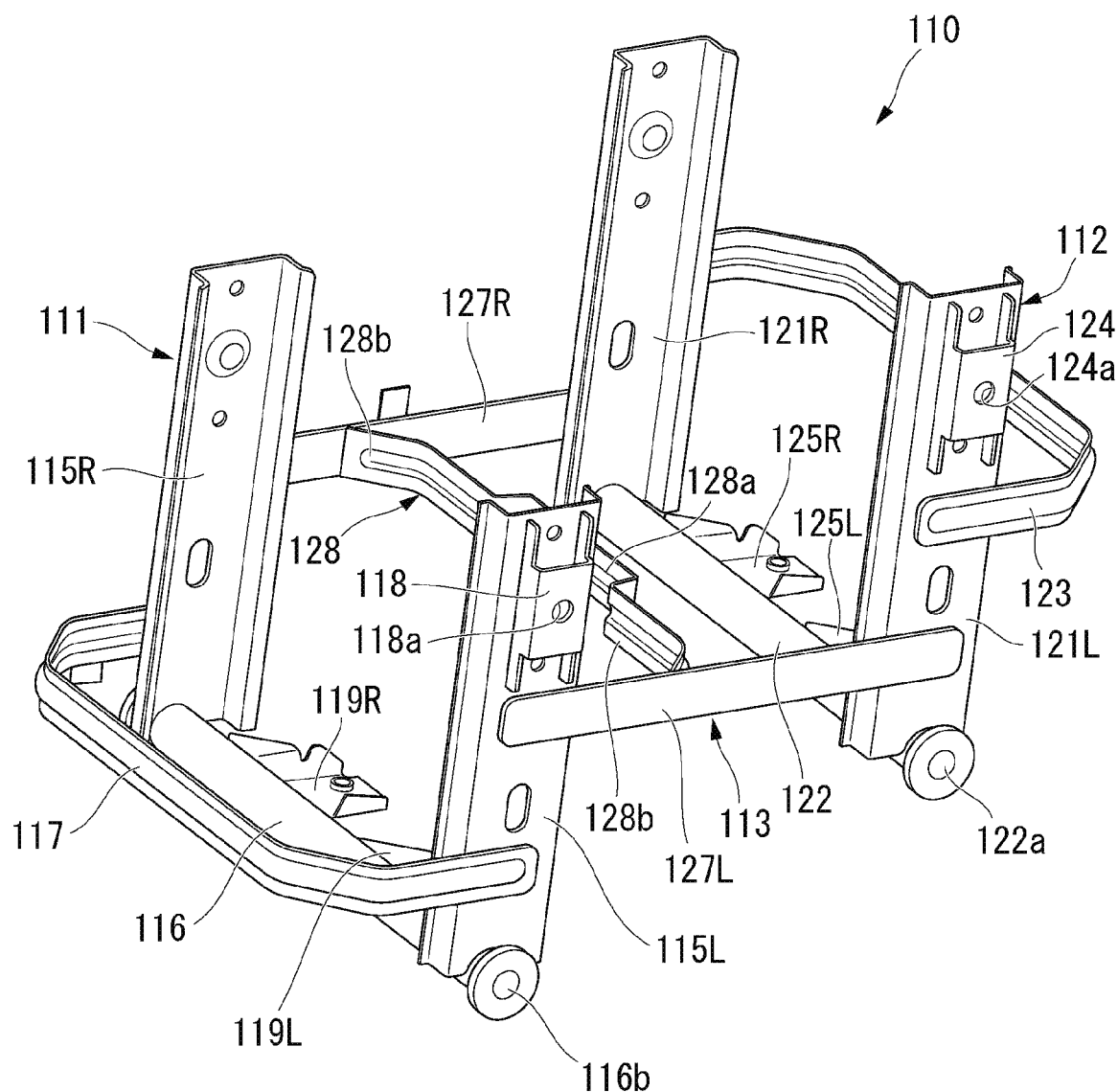
FIG. 6 is a perspective view of a case-supporting structure according to the embodiment from an upper left side.

As shown in FIG. 6, the case-supporting structure 110 includes a first supporting frame 111 that supports the front case 103 (see FIG. 5), a second supporting frame 112 that supports the rear case 104 (see FIG. 5), and a connection frame 113 that connects the first supporting frame 111 and the second supporting frame 112.

<First Supporting Frame>

The first supporting frame 111 includes a pair of left and right first side frames 115L and 115R that extend vertically along an inclination of the front battery 101 (see FIG. 5), a first cross pipe 116 that spans between lower end portions of the left and right first side frames 115L and 115R in the vehicle width direction, and a first cross frame 117 that spans between lower portions of the left and right first side frames 115L and 115R from the front.

Each of the left and right first side frames 115L and 115R has a hat-shaped cross-section that opens inward in the vehicle width direction and extends in a longitudinal direction thereof. First upper supporting brackets 118 for attaching the case-supporting structure 110 to the vehicle body frame 11 (see FIG. 5) are provided at upper end portions of the first left and right side frames 115L and 115R. Female screw portions 118a into which bolts can be screwed are provided in the first upper supporting brackets 118.

Female screw portions 116a into which bolts can be screwed are provided at both end portions of the first cross pipe 116. The first cross pipe 116 is provided with a pair of left and right first lower supporting brackets 119L and 119R which are provided between the left and right first side frames 115L and 115R in the vehicle width direction and extend rearward.

The first cross frame 117 has a forwardly convex curved shape and extends in the vehicle width direction. Both ends of the first cross frame 117 are connected to lower portions of the left and right first side frames 115 from an outer side in the vehicle width direction.

<Second Supporting Frame>

The second supporting frame 112 includes a pair of left and right second side frames 121L and 121R that extend vertically along an inclination of the rear battery 102 (see FIG. 5), a second cross pipe 122 that spans between lower end portions of the left and right second side frames 121L and 121R in the vehicle width direction, and a second cross frame 123 that spans between vertically intermediate portions of the left and right second side frames 121L and 121R from behind.

Each of the left and right second side frames 121L and 121R has a hat-shaped cross-section that opens inward in the vehicle width direction and extends in the longitudinal direction. The second upper supporting brackets 124 for attaching the case-supporting structure 110 to the vehicle body frame 11 (see FIG. 5) are provided at upper end portions of the left and right second side frames 121L and 121R. Female screw portions 124a into which bolts can be screwed are provided in the second upper supporting brackets 124.

Female screw portions 122a into which bolts can be screwed are provided at both end portions of the second cross pipe 122. The second cross pipe 122 is provided with a pair of left and right second lower supporting brackets 125L and 125R which are provided between the left and right second side frames 121L and 121R in the vehicle width direction and extend rearward.

The second cross frame 123 has a rearwardly convex curved shape and extends in the vehicle width direction. Both ends of the second cross frame 123 are connected to vertically intermediate portions of the left and right second side frames 121 from the outside in the vehicle width direction.

<Connection Frame>

The connection frame 113 includes a pair of left and right connection side frames 127L and 127R that span between the first supporting frame 111 and the second supporting frame 112 in the front to rear direction, and a connection cross frame 128 that spans between the left and right connection side frames 127L and 127R in the vehicle width direction.

Each of the left and right connection side frames 127L and 127R is formed in a plate shape extending in the front to rear direction. Front end portions of the left and right connection side frames 127L and 127R are connected to vertically intermediate portions of the left and right first side frames 115L and 115R from an outer side in the vehicle width direction. Rear end portions of the left and right connection side frames 127L and 127R are connected to lower portions of the left and right second side frames 121L and 121R from an outer side in the vehicle width direction.

The connection cross frame 128 is formed in a crank shape that protrudes rearward and extends in the vehicle width direction. Both ends of the connection cross frame 128 are connected to intermediate portions of the left and right connection side frames 127L and 127R in the front to rear direction from an inner side in the vehicle width direction. The connection cross frame 128 includes a central connecting portion 128a which extends in the vehicle width direction in a U shape that opens forward at a center between the left and right connection side frames 127L and 127R in the vehicle width direction, and a pair of left and right side connecting portions 128b which span between both ends of the central connecting portion 128a in the vehicle width direction and the left and right connection side frames 127L and 127R. The left and right side connecting portions 128b extend linearly outward in the vehicle width direction from the both ends of the central connecting portion 128a in the vehicle width direction and then extends to be positioned further forward as it goes outward in the vehicle width direction.

<Details of Vehicle Body Frame>

Figure 7:
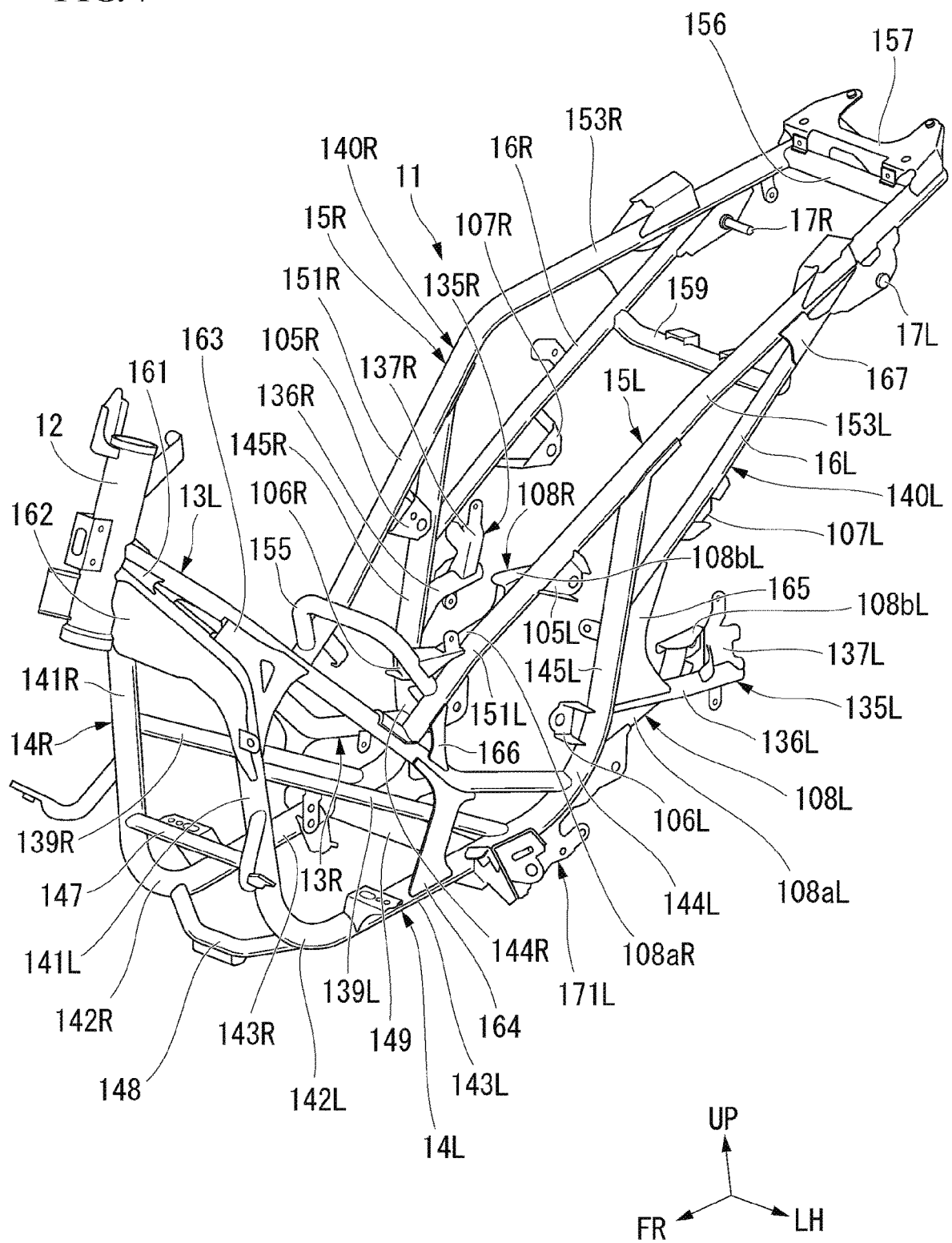
FIG. 7 is a perspective view of a vehicle body frame according to the embodiment from an upper left side.

As shown in FIG. 7, the vehicle body frame 11 includes the head pipe 12 which is positioned at a front end portion of the vehicle and extends vertically, a pair of left and right upper frames 13L and 13R which extend rearward and downward from a vertically intermediate portion of the head pipe 12, a pair of left and right down frames 14L and 14R which extend downward from a lower portion of the head pipe 12, further extend rearward, and then extend upward and rearward, a pair of left and right middle frames 139L and 139R which obliquely extend to be positioned further downward as they go rearward between the left and right upper frames 13L and 13R and the left and right down frames 14L and 14R in the vertical direction, a pair of left and right rear upper frames 15L and 15R (second rear frames) which extend rearward and upward from intermediate portions of the left and right upper frames 13L and 13R in the front to rear direction, and a pair of left and right rear lower frames 16L and 16R (third rear frames) which extend obliquely to be positioned further upward as they go rearward on lower sides of the left and right rear upper frames 15L and 15R.

For example, each component of the vehicle body frame 11 is formed of a round steel pipe. Also, the term "intermediate" used in the present embodiment is intended to include not only a center between both ends of an object but also an intermediary range between the both ends of the object. The down frames 14 and the rear upper frames 15 are formed of round steel pipes having substantially the same diameter as each other. The upper frames 13, the middle frames 139, and the rear lower frames 16 are formed of round steel pipes slightly smaller in diameter than the down frames 14 (rear upper frames 15).

In FIG. 7, reference numeral 17L indicates a left cushion upper shaft-supporting portion that pivotally supports an upper end portion of the left rear cushion 7L (see FIG. 4) to be rotatable, and reference numeral 18R indicates a right cushion upper shaft-supporting portion that pivotally supports an upper end portion of the right rear cushion (not shown) to be rotatable.

<Head Pipe>

Figure 8:
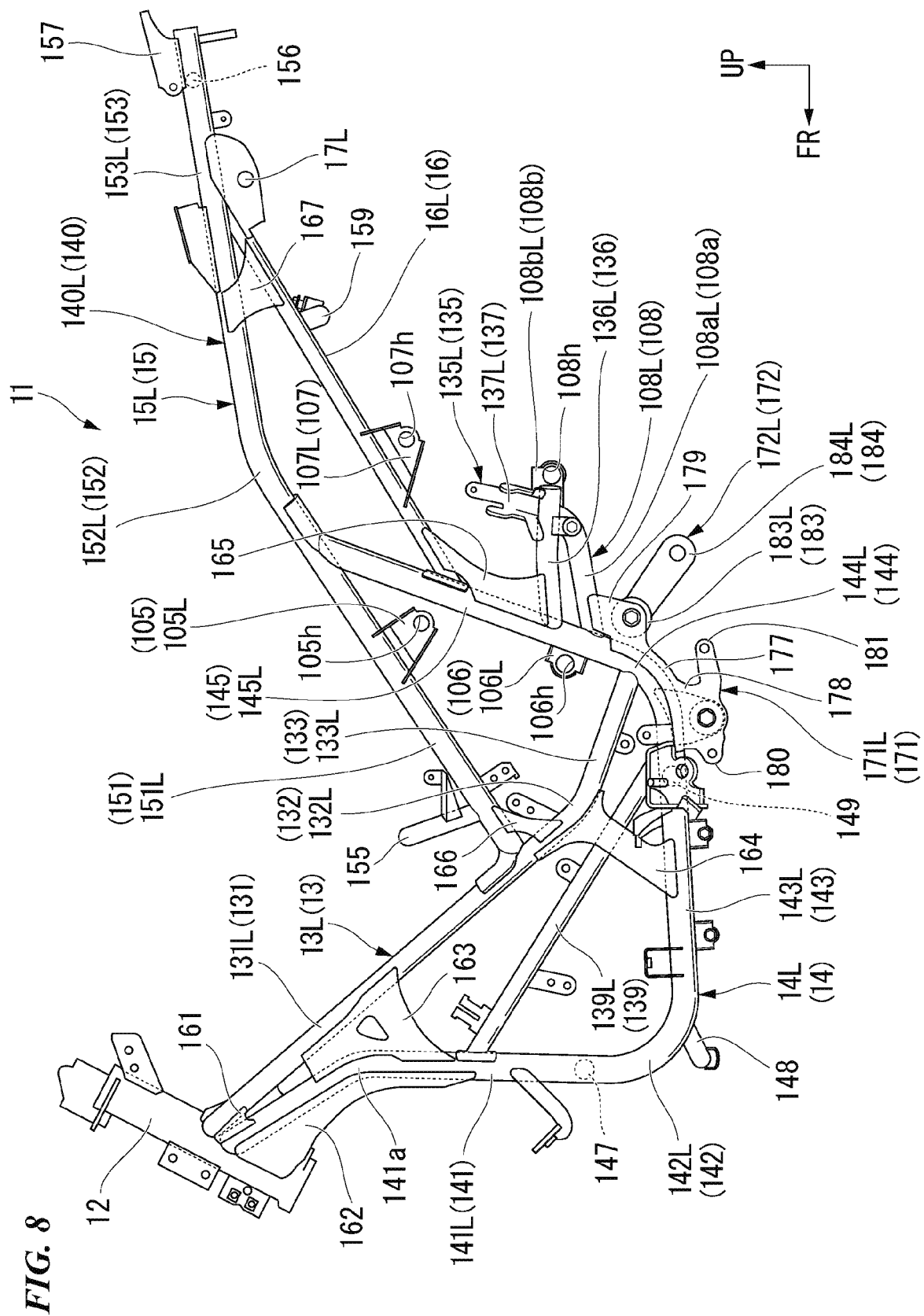
FIG. 8 is a left side view of the vehicle body frame according to the embodiment.

In the side view of FIG. 8, the head pipe 12 extends obliquely to be positioned further rearward as it goes upward. Various brackets for mounting components in a front section of the vehicle are provided on the head pipe 12.

<Upper Frame>

In the side view of FIG. 8, each upper frame 13 includes an upper frame front half portion 131 which extends linearly rearward and downward from a vertically intermediate portion of the head pipe 12, a front lower curved portion 132 which is connected to a lower end of the upper frame front half portion 131 and has a forwardly and downwardly convex curved shape, and an upper frame rear half portion 133 which is connected to a rear end of the front lower curved portion 132 and is inclined more gradually than the upper frame front half portion 131 to linearly extend rearward and downward. The upper frame front half portion 131, the front lower curved portion 132, and the upper frame rear half portion 133 are formed of an integral round steel pipe. A rear lower end of the upper frame rear half portion 133 is connected to a rear lower curved portion 144 of each down frame 14 from the front and above.

Figure 9:
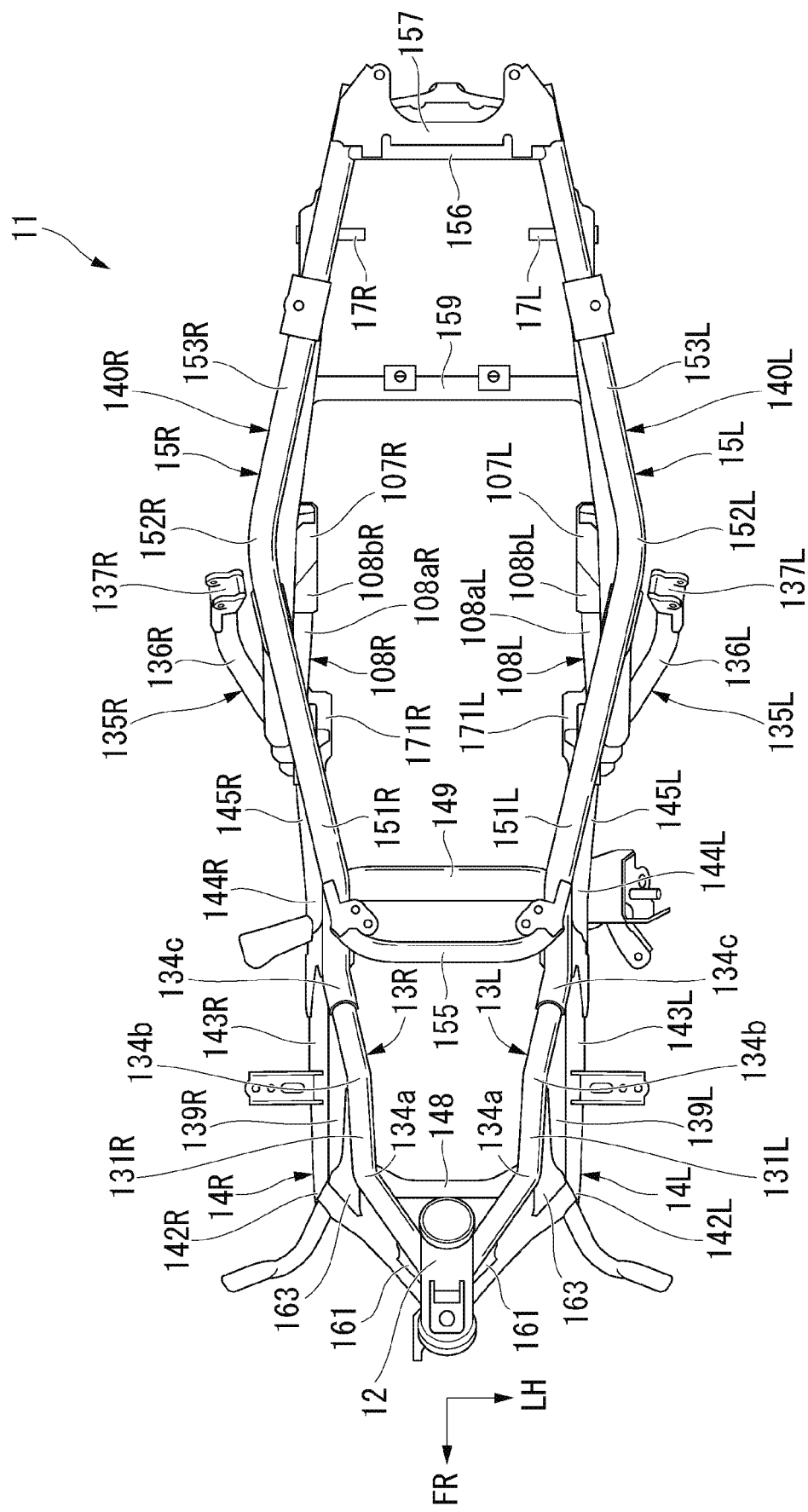
FIG. 9 is a top view of the vehicle body frame according to the embodiment.

In the top view of FIG. 9, the left and right upper frames 13L and 13R are positioned inward from the left and right down frames 14L and 14R in the vehicle width direction. In the top view of FIG. 9, the left and right upper frames 13L and 13R extend obliquely while being curved at a plurality of locations to be positioned further outward in the vehicle width direction as they go rearward from the vertically intermediate portion of the head pipe 12.

In the top view of FIG. 9, the left and right upper frames 13L and 13R are inclined to be positioned outward in the vehicle width direction as they go rearward from the vertically intermediate portion of the head pipe 12 and then bend at the first curved portion 134a to extend substantially parallel to side surfaces of the vehicle body. In the top view of FIG. 9, the left and right upper frames 13L and 13R bend at the first curved portion 134a to extend substantially parallel to the side surfaces of the vehicle body, and then bend at a second curved portion 134b to obliquely extend to be positioned further outward in the vehicle width direction as they go rearward. In the top view of FIG. 9, the left and right upper frames 13L and 13R bend at the second curved portion 134b to obliquely extend to be positioned outward in the vehicle width direction as they go rearward, and then bend at the third curved portion 134c to extend substantially parallel to the side surfaces of the vehicle body.

<Down Frame>

In the side view of FIG. 8, each down frame 14 is formed in a U shape. In the side view of FIG. 8, the down frame 14 includes a front down frame portion 141 which extends downward from the lower portion of the head pipe 12, a lower front curved portion 142 which is connected to a lower end of the front down frame portion 141 and has a forwardly and downwardly convex curved shape, a lower frame portion 143 which is connected to a rear end of the front lower curved portion 142 and extends rearward, a rear lower curved portion 144 which is connected to a rear end of the lower frame portion 143 and has a downwardly and rearwardly convex curved shape, and a rear frame portion 145 (first rear frame) which is continuous with an upper end of the rear lower curved portion 144 and extends rearward and upward. The front down frame portion 141, the front lower curved portion 142, the lower frame portion 143, the rear lower curved portion 144, and the rear frame portion 145 are formed of an integral round steel pipe. Further, the rear frame portions 145L and 145R as the pair of left and right first rear frames, the rear upper frames 15L and 15R as the pair of right and left second rear frames, and the rear lower frames 16L and 16R as the pair of right and left third rear frames constitute a pair of left and right rear frames 140L and 140R disposed in a rear section of the vehicle (see FIG. 7).

In the top view of FIG. 9, the left and right down frames 14L and 14R extend obliquely to be positioned further outward in the vehicle width direction as they go rearward from the lower portion of the head pipe 12, then bend at the lower front curved portion 142 and extend substantially parallel to the side surfaces of the vehicle body to reach the rear lower curved portion 144, and then bend at the rear lower curved portion 144 and extend obliquely to be positioned outward in the vehicle width direction as they go rearward.

As shown in FIG. 8, a front upper curved portion 141a having an upwardly and rearwardly curved shape is provided in the front down frame portion 141. In the side view of FIG. 8, the front down frame portion 141 extends rearward and downward from the lower portion of the head pipe 12, then bends at the front upper curved portion 141a, and extends substantially vertically downward.

As shown in FIG. 7, a front middle cross frame 147 that spans between the left and right front down frame portions 141L and 141R in the vehicle width direction is provided between lower portions of the left and right front down frame portions 141L and 141R. The front middle cross frame 147 extends linearly in the vehicle width direction. Both ends of the front middle cross frame 147 are connected to the left and right front down frame portions 141L and 141R from an inner side in the vehicle width direction. The front middle cross frame 147 is formed of a round steel pipe smaller in diameter than the down frames 14.

As shown in FIG. 7, a lower front cross frame 148 that spans between the left and right front lower curved portions 142L and 142R in the vehicle width direction is provided between the left and right front lower curved portions 142L and 142R. The lower front cross frame 148 has a forwardly and downwardly curved shape, and extends in the vehicle width direction. Both ends of the lower front cross frame 148 are connected to the left and right lower front curved portions 142L and 142R from an inner side in the vehicle width direction. The lower front cross frame 148 is formed of a round steel pipe smaller in diameter than the down frames 14.

In the side view of FIG. 8, the lower frame portion 143 extends substantially in the front to rear direction of the vehicle. As shown in FIG. 7, a lower cross frame 149 which spans between the left and right lower frames 143L and 143R in the vehicle width direction is provided between the left and right lower frame portions 143L and 143R. The lower cross frame 149 extends linearly in the vehicle width direction. Both ends of the lower cross frame 149 are connected to the left and right lower frame portions 143L and 143R from an inner side in the vehicle width direction. The lower cross frame 149 is formed of a round steel pipe having substantially the same diameter as those of the down frames 14.

In the top view of FIG. 9, left and right rear lower curved portions 144L and 144R are inclined to be positioned such that portions thereof positioned further upward are positioned outward in the vehicle width direction.

In the top view of FIG. 9, lower portions of the left and right rear frame portions 145L and 145R are inclined to be positioned such that portions thereof positioned further upward are positioned outward in the vehicle width direction, in accordance with inclinations of the rear lower curved portions 144L and 144R. The left and right rear frame portions 145L and 145R are gently curved inward in the vehicle width direction above their lower portions and extend substantially parallel to the side surfaces of the vehicle body.

As shown in FIG. 7, a pair of left and right step-supporting stays 135L and 135R which support a pillion step (not shown) are provided below the left and right rear frame portions 145L and 145R. The left and right step-supporting stays 135L and 135R include step-supporting stay bodies 136L and 136R which extend rearward from lower portions of the rear frame portions 145L and 145R, and step-supporting portions 137L and 137R which extend upward from rear end portions of the step-supporting stay bodies 136L and 136R.

In the side view of FIG. 8, the step-supporting stay bodies 136 extend in the front to rear direction. In the top view of FIG. 9, the left and right step-supporting stay bodies 136L and 136R are curved and extend to be positioned further outward in the vehicle width direction as they go rearward. As shown in FIG. 8, front ends of the step-supporting stay bodies 136 are connected to lower portions of the left and right rear frame portions 145 from behind. The step-supporting stay bodies 136 are formed of round steel pipes having smaller diameters than those of the down frames 14.

<Middle Frame>

In the side view of FIG. 8, the middle frames 139 extend linearly downward and rearward. Front upper ends of the middle frames 139 are connected to vertically intermediate portions of the front down frame portions 141 from behind. Rear lower ends of the middle frames 139 are connected to rear portion of the lower frame portions 143 from above.

In the plan view of FIG. 9, the left and right middle frames 139L and 139R are disposed to be positioned between the left and right upper frames 13L and 13R and the left and right lower frame portions 143L and 143R. In the plan view of FIG. 9, the left and right middle frames 139L and 139R extend substantially parallel to the side surfaces of the vehicle body.

<Rear Upper Frame>

In the side view of FIG. 8, each of the rear upper frames 15 includes a rear upper front half portion 151 (a front extension portion) which extends linearly forward and downward from an upper end portion of the rear frame portion 145, an intermediate curved portion 152 which is continuous with a rear end of the rear upper front half portion 151 and has an upwardly and forwardly convex curved shape, and a rear upper rear half portion 153 which is continuous with a rear end of the intermediate curved portion 152 and is inclined more gradually than the rear upper front half portion 151 and linearly extends rearward and upward. The rear upper front half portion 151, the intermediate curved portion 152, and the rear upper rear half portion 153 are formed of an integral round steel pipe. A front lower end of the rear upper front half portion 151 is connected to the upper frame front half portion 131 from above and behind.

In the top view of FIG. 9, left and right rear upper frame front half portions 131L and 131R obliquely extend to be positioned outward in the vehicle width direction as they go rearward between connection portions thereof with a center cross frame 155 and intermediate curved portions 152L and 152R. In the top view of FIG. 9, left and right rear upper rear half portions 153L and 153R obliquely extend to be positioned inward in the vehicle width direction as they go rearward between the intermediate curved portions 152L and 152R to rear ends thereof.

As shown in FIG. 7, the center cross frame 155 that spans between the left and right rear upper front half portions 151L and 151R in the vehicle width direction is provided between front end portions of the left and right rear upper front half portions 151L and 151R. The center cross frame 155 has an upwardly and forwardly convex curved shape and extends in the vehicle width direction. In other words, the center cross frame 155 has a U shape (a reverse U shape) that opens downward and rearward. Both ends of the center cross frame 155 are connected to front end portions of the left and right rear upper front half portions 151L and 151R from the front and above. The center cross frame 155 is formed of a round steel pipe having a smaller diameter than those of the rear upper frames 15.

A rear end cross frame 156 and a rear end cross plate 157 that span between the left and right rear upper rear half portions 153L and 153R in the vehicle width direction are provided between rear end portions of the left and right rear upper rear half portions 153L and 153R.

The rear end cross frame 156 linearly extends in the vehicle width direction. Both ends of the rear end cross frame 156 are connected to rear end portions of the left and right rear upper rear half portions 153L and 153R from an inner side in the vehicle width direction. The rear end cross frame 156 is formed of a round steel pipe having substantially the same diameter as those of the rear upper frames 15.

The rear end cross plate 157 extends in the vehicle width direction to form a U shape that opens rearward. Both ends of the rear end cross plate 157 are connected to rear end portions of the left and right rear upper rear half portions 153L and 153R from above.

<Rear Lower Frame>

In the side view of FIG. 8, the rear lower frames 16 extend substantially parallel to the rear upper front half portions 151. Front ends of the rear lower frames 16 are connected to vertically intermediate portions of the rear frame portions 145 from behind. Rear ends of the rear lower frames 16 are connected to intermediate portions of the rear upper rear half portions 153 in the front to rear direction from below.

As shown in FIG. 7, a rear lower cross frame 159 which spans between the left and right rear lower frames 16L and 16R in the vehicle width direction is provided between the left and right rear lower frames 16L and 16R. The rear lower cross frame 159 has a downwardly convex curved shape and extends in the vehicle width direction. Both ends of the rear lower cross frame 159 are connected to intermediate portions of the left and right rear lower frames 16L and 16R in the front to rear direction from an inner side in the vehicle width direction. The rear lower cross frame 159 is formed of a round steel pipe having substantially the same diameter as those of the rear lower frames 16.

<Gusset>

As shown in FIG. 8, various gussets for reinforcing each element of the vehicle body frame 11 are provided on the vehicle body frame 11. Intermediate gussets 161 that connect front upper end portions of the upper frames 13 and front upper end portions of the down frames 14 are provided at vertically intermediate portions of the head pipe 12. Front gussets 162 for reinforcing front upper portions of the down frames 14 are provided at lower portions of the head pipe 12.

Upper gussets 163 for reinforcing the upper frames 13 and the down frames 14 are provided between the upper frame front half portions 131 and the front down frame portions 141.

Lower gussets 164 for reinforcing the upper frames 13 and the down frames 14 are provided between the front lower curved portions 132 and the lower frame portions 143.

Side gussets 165 for connecting front end portions of the rear lower frames 16 and front end portions of the step-supporting stays 135 are provided at vertically intermediate portions of the rear frame portions 145.

Middle gussets 166 for reinforcing the rear upper frames 15 and the upper frames 13 are provided between the rear upper front half portions 151 and the upper frame front half portions 131.

Rear gussets 167 for reinforcing the rear lower frames 16 and the rear upper frames 15 are provided between the rear lower frames 16 and the rear upper rear half portions 153.

<Battery Arrangement Structure>

As shown in FIG. 4, a battery arrangement structure 100A which includes the pair of left and right rear frames 140L and 140R, and the rear battery 102 disposed between the left and right rear frames 140L and 140R is provided in a rear section of the vehicle.

The battery arrangement structure 100A further includes the rear battery 102 disposed behind the front case 103 that accommodates the front battery 101, the pair of left and right rear upper frames 15L and 15R, the pair of left and right rear lower frames 16L and 16R, a pair of left and right first upper brackets 105L and 105R which protrude rearward and downward from rear portions of the left and right rear upper front half portions 151L and 151R, a pair of left and right first lower brackets 106L and 106R which protrude forward and upward from lower portions of the left and right rear frame portions 145L and 145R, a pair of left and right second upper brackets 107L and 107R which protrude rearward and downward from front portions of the left and right rear lower frames 16, a pair of left and right battery-supporting portions 108L and 108R which extend rearward from lower portions of the left and right rear frame portions 145L and 145R, and a power unit-supporting structure 170 which extends rearward from lower rear portions of the left and right down frames 14L and 14R and swingably supports the power unit 10.

<First Upper Bracket>

As shown in FIG. 7, the left and right first upper brackets 105L and 105R are connected to the rear portions of the left and right rear upper front half portions 151L and 151R from below. As shown in FIG. 8, the first upper brackets 105 are provided with through-holes 105h (hereinafter, referred to as "first upper through-holes 105h") that open in the vehicle width direction such that stem portions of bolts can be inserted therethrough.

For example, as shown in FIG. 5, by inserting bolts 191 into the first upper through-holes 105h (see FIG. 8) of the first left and right upper brackets 105 from an outer side in the vehicle width direction to cause stem portions of the bolts 191 to protrude and screwing the protruding portions of the respective stem portions into the respective female screw portions 118a of the left and right first upper supporting brackets 118 (see FIG. 7), the first supporting frame 111 can be fixed to the first upper brackets 105.

<First Lower Bracket>

As shown in FIG. 7, the left and right first lower brackets 106L and 106R are connected to the left and right rear frame portions 145L and 145R from the front. The left and right first lower brackets 106L and 106R are disposed on opposite sides of the left and right battery-supporting portions 108L and 108R with the left and right rear frame portions 145L and 145R interposed therebetween. As shown in FIG. 8, the first lower brackets 106 are provided with through-holes 106h (hereinafter, referred to as "first lower through-holes 106h") that open in the vehicle width direction such that stem portions of bolts can be inserted therethrough.

For example, as shown in FIG. 5, by inserting bolts 192 into the first lower through-holes 106h (see FIG. 8) of the first left and right lower brackets 106L and 106R from an outer side in the vehicle width direction to cause stem portions of the bolts 192 to protrude and screwing the protruding portions of the respective stem portions to the respective female screw portions 116a of the first cross pipe 116 (see FIG. 6), the first supporting frame 111 can be fixed to the first lower brackets 106.

<Second Upper Bracket>

As shown in FIG. 7, the left and right second upper brackets 107L and 107R are connected to the front portions of the left and right rear lower frames 16L and 16R from below. As shown in FIG. 8, the second upper brackets 107 are provided with through-holes 107h (hereinafter, referred to as "second upper through-holes 107h") that open in the vehicle width direction such that stem portions of bolts can be inserted therethrough.

For example, as shown in FIG. 5, by inserting bolts 193 into the second upper through-holes 107h (see FIG. 8) of the left and right second upper brackets 107L and 107R from an outer side in the vehicle width direction to cause stem portions of the bolts 193 to protrude and screwing the protruding portions of the respective stem portions into the respective female screw portions 124a of the left and right second upper supporting brackets 124 (see FIG. 6), the second supporting frame 112 can be fixed to the second upper brackets 107.

<Battery-Supporting Portion>

As shown in FIG. 7, the left and right battery-supporting portions 108L and 108R respectively include left and right battery-supporting stay bodies 108aL and 108aR which extend rearward from lower portions of the left and right rear frame portions 145L and 145R, and second lower brackets 108bL and 108bR which extend rearward from rear end portions of the battery-supporting stay bodies 108aL and 108aR.

In the side view of FIG. 8, the battery-supporting stays 108 obliquely extend gently to be positioned further upward as they go rearward. In the top view of FIG. 9, the left and right battery-supporting stays 108L and 108R obliquely extend to be positioned inward in the vehicle width direction as they go rearward. In the top view of FIG. 9, the left and right battery-supporting stays 108L and 108R are positioned inward in the vehicle width direction from the left and right step-supporting stays 135L and 135R.

As shown in FIG. 8, front ends of the battery-supporting stay bodies 108a are connected to lower portions of the rear frame portions 145 from behind. Each of the battery-supporting stay bodies 108a is formed of a round steel pipe having a smaller diameter than those of the down frames 14.

The second lower brackets 108b are provided with through-holes 108h (hereinafter, referred to as "second lower through-holes 108h") that open in the vehicle width direction such that stem portions of bolts can be inserted therethrough.

For example, as shown in FIG. 5, by inserting bolts 194 into the second lower through-holes 108h (see FIG. 8) of the left and right second lower brackets 108bL and 108bR from an outer side in the vehicle width direction to cause stem portions of the bolts 194 to protrude and screwing the protruding portion of each stem portion to each female screw portion 122a of the second cross pipe 122 (see FIG. 6), the second supporting frame 112 can be fixed to the second lower brackets 108b.

<Power Unit-Supporting Structure>

As shown in FIG. 5, the power unit-supporting structure 170 includes a pair of left and right lower brackets 171L and 171R which are provided along the rear lower curved portions 144L and 144R of the left and right down frames 14L and 14R, a pair of left and right rear extension portions 172L and 172R which extend rearward from lower sides of the left and right rear frame portions 145L and 145R, and a lower cross pipe 174 which spans between the left and right lower brackets 171L and 171R in the vehicle width direction. Each element of the power unit-supporting structure 170 constitutes the link mechanism 19.

<Lower Bracket>

As shown in FIG. 8, the lower brackets 171 respectively include lower bracket bodies 177 that curve along the rear lower curved portions 144 of the down frames 14, lower protruding portions 178 which protrude downward from lower front portions of the lower bracket bodies 177, rear protruding portions 179 which protrude rearward from an upper rear portions of the lower bracket bodies 177, lower front protruding portions 180 which protrude forward from the lower protruding portions 178, and lower rear extension portions 181 which extend rearward from the lower protruding portions 178.

Figure 10:
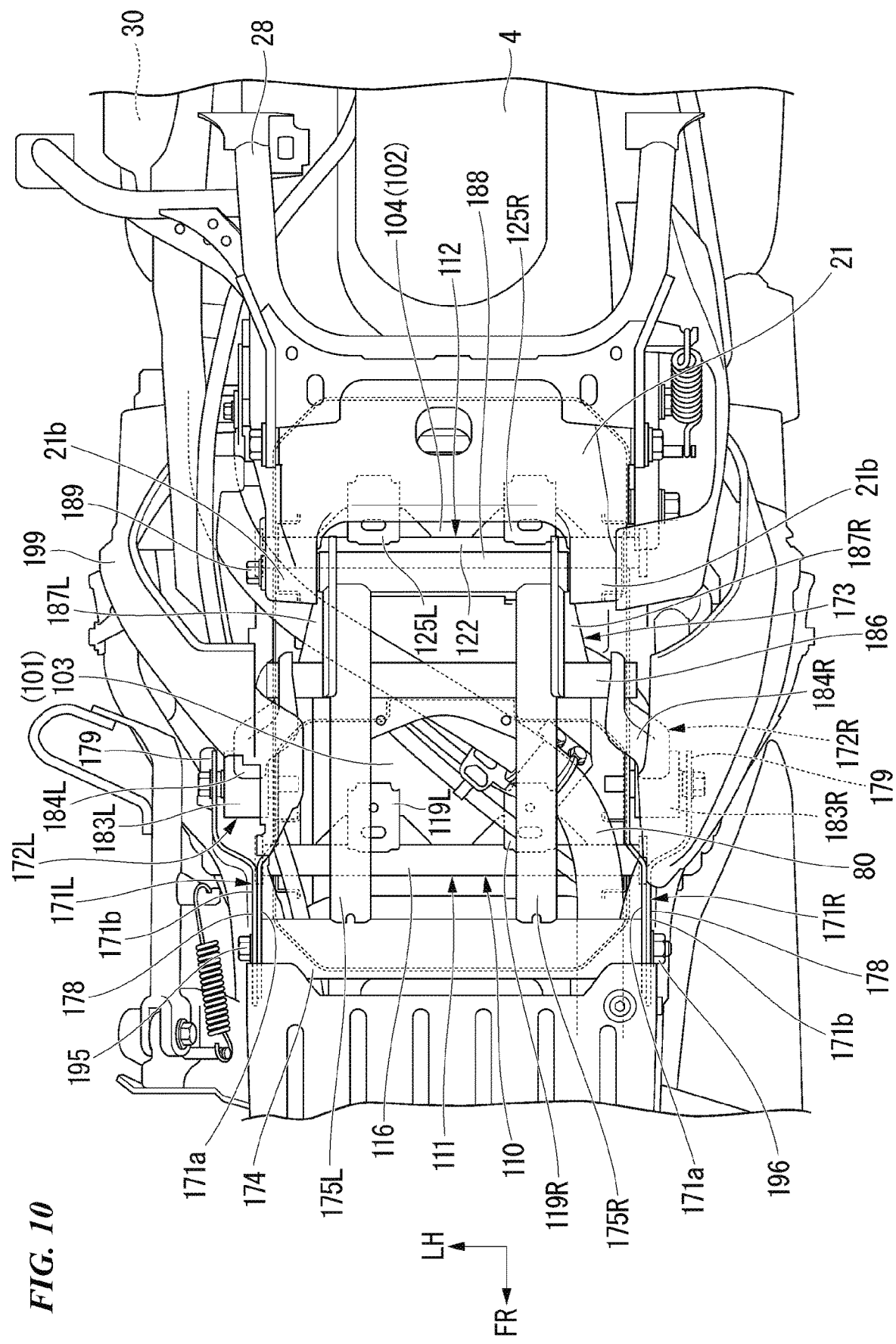
FIG. 10 is a bottom view of the battery arrangement structure according to the embodiment.

As shown in FIG. 10, the lower brackets 171 respectively include inner brackets 171a positioned inward in the vehicle width direction, and outer brackets 171b positioned outward in the vehicle width direction from the inner brackets 171a. In the lower protruding portions 178, the inner brackets 171a and the outer brackets 171b are connected to each other. In the rear protruding portions 179, the inner brackets 171a and the outer brackets 171b are separated from each other in the vehicle width direction.

<Rear Extension Portion>

In the side view of FIG. 8, the rear extension portions 172 include boss portions 183 supported by the rear protruding portions 179 of the lower brackets 171, inclined extension portions 184 obliquely extending rearward and downward from the left and right boss portions 183, and a pair of left and right connecting pipes 175L and 175R extending rearward from the lower cross pipe 174 (see FIG. 10).

As shown in FIG. 10, the left and right boss portions 183L and 183R are respectively positioned between the inner brackets 171a and the outer brackets 171b at the rear protruding portions 179 of the left and right lower brackets 171L and 171R. In the bottom view of FIG. 10, the left and right inclined extension portions 184L and 184R obliquely extend to be positioned further inward in the vehicle width direction as they go rearward from the left and right boss portions 183L and 183R, and then bend and extend rearward.

<Power Unit-Supporting Portion>

As shown in FIG. 10, the power unit-supporting portion 173 that swingably supports the power unit 10 is provided at rear portions of the left and right rear extension portions 172L and 172R. The power unit-supporting portion 173 includes a cross member 186 extending in the vehicle width direction, a pair of left and right rear extension brackets 187L and 187R extending rearward from the cross member 186, and a pivot shaft-supporting portion 188 extending in the vehicle width direction behind the cross member 186.

Both ends of the cross member 186 are positioned outward in the vehicle width direction from rear end portions of the left and right inclined extension portions 184L and 184R. Both end portions of the cross member 186 are joined to the rear end portions of the left and right inclined extension portions 184L and 184R by welding or the like.

The left and right rear extension brackets 187L and 187R span between the cross member 186 and the pivot shaft-supporting portion 188 in the front to rear direction. In the bottom view of FIG. 10, the left and right rear extension brackets 187L and 187R extend in the front to rear direction between the left and right front extension portions 21b of the main arm 21 in the vehicle width direction. Front end portions of the left and right rear extension brackets 187L and 187R are joined to the cross member 186 by welding or the like. Rear end portions of the left and right rear extension brackets 187L and 187R are connected to the pivot shaft-supporting portion 188 by welding or the like. The left and right rear extension brackets 187L and 187R are connected to outer sides of rear portions of the left and right connecting pipes 175L and 175R in the vehicle width direction by welding or the like. Further, the left and right rear extension brackets 187L and 187R constitute rear portions of the left and right rear extension portions 172L and 172R.

The pivot shaft-supporting portion 188 is rotatably supported by a pivot shaft 189. The pivot shaft-supporting portion 188 has a cylindrical shape extending in the vehicle width direction. In the bottom view of FIG. 10, the pivot shaft-supporting portion 188 is positioned between the left and right front extension portions 21b of the main arm 21 in the vehicle width direction.

<Lower Cross Pipe>

As shown in FIG. 10, the lower cross pipe 174 spans between the lower protruding portions 178 of the left and right lower brackets 171L and 171R in the vehicle width direction. For example, by inserting a bolt 195 into a through-hole (not shown) of the lower protruding portion 178 and into the lower cross pipe 174 from a left side of the lower cross pipe 174 to cause a stem portion of the bolt 195 to protrude and screwing a nut 196 into the protruding portion of the stem portion from a right side of the lower cross pipe 174, the lower cross pipe 174 can be fixed to the lower brackets 171.

<Connecting Pipe>

As shown in FIG. 10, the left and right connecting pipes 175L and 175R span between the lower cross pipe 174 and the pivot shaft-supporting portion 188 in the front to rear direction. In the bottom view of FIG. 10, the left and right connecting pipes 175L and 175R extend linearly in the front to rear direction between the lower cross pipe 174 and the pivot shaft-supporting portion 188. Front end portions of the left and right connecting pipes 175L and 175R are connected to the lower cross pipe 174 by welding or the like. Rear end portions of the left and right connecting pipes 175L and 175R are connected to the pivot shaft-supporting portion 188 by welding or the like.

<Positional Relationships Between Respective Elements of Battery Arrangement Structure>

In the side view of FIG. 5, the front battery 101 and the rear battery 102 are disposed between the left and right rear upper frames 15L and 15R in the vehicle width direction. In the side view of FIG. 5, the front battery 101 and the rear battery 102 are disposed above the power unit-supporting portion 173. In the side view of FIG. 4, the rear extension portions 172 are disposed below the front battery 101 and the rear battery 102.

In the side view of FIG. 5, the front battery 101 and the rear battery 102 are obliquely disposed to be positioned further rearward as they go upward. In the side view of FIG. 5, the front case 103 and the rear case 104 are obliquely disposed to be positioned further rearward as they go upward. A lower end portion of the rear battery 102 is disposed above a lower end portion of the front battery 101.

In the side view of FIG. 5, a lower rear end H2 of the rear battery 102 is disposed above a lower rear end H1 of the front battery 101. The lower rear end H1 of the front battery 101 corresponds to a height of a lower rear end of the front case 103. The lower rear end H2 of the rear battery 102 corresponds to a height of a lower rear end of the rear case 104.

In the side view of FIG. 5, an upper front end H4 of the rear battery 102 is disposed above an upper front end H3 of the front battery 101.

In the side view of FIG. 5, an upper rear end H5 of the rear battery 102 is disposed below upper edges 15e of the left and right rear upper frames 15L and 15R. The upper edges 15e of the left and right rear upper frames 15L and 15R correspond to upper edges of the left and right intermediate curved portions 152L and 152R.

In the side view of FIG. 5, the upper front end H4 of the rear battery 102 is disposed below the upper edges 15e of the left and right rear upper frames 15L and 15R.

In the side view of FIG. 5, the left and right rear frame portions 145L and 145R are positioned on outer sides of a rear portion of the front battery 101 in the vehicle width direction. In the side view of FIG. 5, the front case 103 is disposed between the left and right rear frame portions 145L and 145R. In the side view of FIG. 5, the left and right rear frame portions 145L and 145R overlap the rear portion of the front battery 101 from a lower portion to an upper portion of the front battery 101. In the side view of FIG. 5, the left and right rear frame portions 145L and 145R overlap the rear portion of the front case 103 from a lower portion to an upper portion of the front case 103.

In the side view of FIG. 5, the left and right rear upper frames 15L and 15R overlap an upper portion of the front battery 101 and an upper portion of the rear battery 102. In the side view of FIG. 5, the left and right rear upper frames 15L and 15R overlap an upper portion of the front case 103. In the side view of FIG. 5, the left and right rear upper front half portions 151L and 151R overlap a vertically intermediate portion of the front battery 101. In the side view of FIG. 5, the left and right rear upper front half portions 151L and 151R overlap a vertically intermediate portion of the front case 103. In the side view of FIG. 5, the left and right rear upper front half portions 151L and 151R overlap the front battery 101 from a vertically intermediate portion of a front portion of the front battery 101 to an upper end portion of the rear portion of the front battery 101.

In the side view of FIG. 5, the left and right rear lower frames 16L and 16R overlap the vertically intermediate portion of the front battery 101 and the vertically intermediate portion of the rear battery 102. In the side view of FIG. 5, the left and right rear lower frames 16L and 16R overlap the vertically intermediate portion of the front case 103 and the vertically intermediate portion of the rear case 104. In the side view of FIG. 5, the left and right rear lower frames 16L and 16R overlap the front battery 101 and the rear battery 102 from a vertically intermediate portion of the rear portion of the front battery 101, to a vertically intermediate portion of the front portion of the rear battery 102, and to an upper end portion of a rear portion of the rear battery 102.

As shown in FIG. 5, the left and right battery-supporting portions 108L and 108R are disposed below the front battery 101 and the rear battery 102. In the side view of FIG. 5, the left and right battery-supporting portions 108L and 108R extend to be positioned further upward as they go rearward from a lower rear portion of the front battery 101 to a lower front portion of the rear battery 102.

As shown in FIG. 5, a fender 199 that is inclined to be positioned further upward as it goes rearward is provided between the rear battery 102 and the rear wheel 4. The fender 199 covers the rear portion of the rear battery 102 from an outer side in the vehicle width direction. In the side view of FIG. 5, the fender 199 overlaps the rear battery 102 and the power unit-supporting structure 170 from an upper rear portion of the rear battery 102 to a rear portion of the connecting pipe 175.

In the bottom view of FIG. 10, the front battery 101 and the rear battery 102 are disposed inward in the vehicle width direction from both ends of the pivot shaft 189. In the bottom view of FIG. 10, the front case 103 and the rear case 104 are disposed inward in the vehicle width direction from the both ends of the pivot shaft 189. In the bottom view of FIG. 10, the left and right connecting pipes 175L and 175R overlap the front case 103 and the rear case 104 from a lower front portion of the front case 103 to a lower front portion of the rear case 104. In FIG. 10, reference numeral 80 indicates a three-phase wire (electric wire) extending toward the motor 30.

As described above, in the battery arrangement structure 100A of the embodiment described above which includes the pair of left and right rear frames 140L and 140R disposed in the rear section of the vehicle, and the rear battery 102 disposed between the pair of left and right rear frames 140L and 140R, the pair of left and right rear frames 140L and 140R include the pair of left and right rear frame portions 145L and 145R extending upward from a lower portion of the vehicle, and the pair of left and right rear upper frames 15L and 15R extending rearward from upper end portions of the pair of left and right rear frame portions 145L and 145R. The battery arrangement structure 100A further includes the pair of left and right rear extension portions 172L and 172R extending rearward from lower sides of the pair of left and right rear frame portions 145L and 145R, and the front case 103 disposed between the pair of left and right rear frame portions 145L and 145R. The power unit-supporting portion 173 which swingably supports the power unit 10 is provided at the rear portions of the pair of left and right rear extension portions 172L and 172R. The rear battery 102 is disposed between the pair of left and right rear upper frames 15L and 15R and above the power unit-supporting portion 173.

According to the present embodiment, since the front case 103 is disposed between the left and right rear frame portions 145L and 145R, the front case 103 can be protected from external factors from an outer side in the vehicle width direction. In addition, since the rear battery 102 is disposed between the left and right rear upper frames 15L and 15R, the rear battery 102 can be protected from external factors from an outer side in the vehicle width direction. Further, since the rear battery 102 is disposed above the power unit-supporting portion 173, the rear battery 102 is far away from the rear wheel 4 positioned behind the power unit-supporting portion 173, and thus, the feasibility of layout with peripheral components such as the rear wheel 4 can be satisfied. Accordingly, the feasibility of layout with peripheral components can be satisfied while the front case 103 and the rear battery 102 can be protected.

The pair of left and right rear frames 140L and 140R further include the left and right rear lower frames 16L and 16R extending rearward from the vertically intermediate portions of the left and right rear frame portions 145L and 145R, the left and right rear upper frames 15L and 15R overlap the upper portion of the front case 103 and the upper portion of the rear battery 102 in a side view, and the left and right rear lower frames 16L and 16R overlap the vertically intermediate portion of the front case 103 and the vertically intermediate portion of the rear battery 102 in a side view, whereby the following effects are obtained. The upper portion of the front case 103 and the upper portion of the rear battery 102 can be protected by the left and right rear upper frames 15L and 15R from external factors from an outer side in the vehicle width direction. In addition, the vertically intermediate portion of the front case 103 and the vertically intermediate portion of the rear battery 102 can be protected by the left and right rear lower frames 16L and 16R from external factors from an outer side in the vehicle width direction. Therefore, the front case 103 and the rear battery 102 can be more effectively protected.

The embodiment further includes the pair of left and right battery-supporting portions 108L and 108R extending rearward from lower portions of the left and right rear frame portions 145L and 145R, and the left and right battery-supporting portions 108L and 108R are disposed below the front case 103 and the rear battery 102, whereby the following effects are obtained. Since the left and right battery-supporting portions 108L and 108R can be disposed in a dead space existing between the front case 103, the rear battery 102, and the rear extension portions 172, this is suitable for satisfying the feasibility of layout with peripheral components.

The left and right rear upper frames 15L and 15R include rear upper front half portions 151L and 151R extending forward from upper end portions of the left and right rear frame portions 145L and 145R, and the rear upper front half portions 151L and 151R overlap the vertically intermediate portion of the front case 103 in a side view, whereby the following effects are obtained. The vertically intermediate portion of the front case 103 can be protected by the left and right rear upper front half portions 151L and 151R from external factors from an outer side in the vehicle width direction. Therefore, the front case 103 can be protected more effectively.

The front case 103 and the rear battery 102 are obliquely disposed to be positioned further rearward as they go upward in a side view, whereby the following effects are obtained. Since upper end positions of the front case 103 and the rear battery 102 can be lower than the case in which the front case 103 and the rear battery 102 are disposed in the vertical direction, a seat height can be kept as low as possible. In addition, an arrangement space for the fender 199 can be easily secured between the rear battery 102 and the rear wheel 4 in the front to rear direction.

The lower rear end H2 of the rear battery 102 is disposed above the lower rear end H1 of the front case 103 in a side view, and the upper rear end H5 of the rear battery 102 is disposed below the upper edges 15e of the rear upper frames 15 in a side view, whereby the following effects are obtained. Since upper end positions of the front case 103 and the rear battery 102 can be lowered as compared with the case in which the upper rear end H5 of the rear battery 102 is disposed above the upper edges 15e of the rear upper frames 15, the seat height can be kept as low as possible.

The upper front end H4 of the rear battery 102 is positioned below the upper edges 15e of the rear upper frames 15 in a side view, whereby the following effects are obtained. Since the upper end positions of the front case 103 and the rear battery 102 can be lowered as compared with the case in which the upper front end H4 of the rear battery 102 is disposed above the upper edges 15e of the rear upper frames 15, the seat height can be kept as low as possible.

The left and right rear frame portions 145L and 145R overlap the rear portion of the front case 103 from the lower portion to the upper portion of the front case 103 in a side view, whereby the following effects are obtained. The rear portion of the front case 103 can be protected by the left and right rear frame portions 145L and 145R from external factors from an outer side in the vehicle width direction. Therefore, the front case 103 can be protected more effectively.

The pivot shaft 189 extending in the vehicle width direction is provided in the power unit-supporting portion 173, and the front case 103 and the rear battery 102 are disposed inward in the vehicle width direction from the both ends of the pivot shaft 189, whereby the following effects are obtained. The front case 103 and the rear battery 102 can be protected by the both ends of the pivot shaft 189 from external factors from an outer side in the vehicle width direction. Therefore, the front case 103 and the rear battery 102 can be protected more effectively.

The above embodiment further includes the front battery 101 positioned in front of the rear battery 102 and the front case 103 is a battery-accommodating section which accommodates the front battery 101, whereby the following effects are obtained. The front battery 101 can be protected by the front case 103 from external factors. Therefore, the feasibility of layout with the peripheral components can be satisfied while a plurality of batteries 101 and 102 can be protected. In addition, since the front case 103 is disposed between the left and right rear frame portions 145L and 145R, the front battery 101 can be protected from external factors from an outer side in the vehicle width direction. Therefore, a protective effect obtained by the left and right rear frame portions 145L and 145R and a protective effect obtained by the front case 103 are combined with each other, thereby protecting the front battery 101 more effectively.

In the above embodiment, the front battery 101 and the rear battery 102 are mobile batteries that can be attached to and detached from the vehicle, whereby the following effects are obtained. The feasibility of layout with peripheral components can be satisfied while a plurality of mobile batteries can be protected. In addition, in the case in which the front battery 101 and the rear battery 102 are obliquely disposed to be positioned further rearward as they go upward in a side view, attaching and detaching characteristics of the front battery 101 and the rear battery 102 with respect to the vehicle can be improved as compared with the case in which the front battery 101 and the rear battery 102 are disposed in the vertical direction.

The above embodiment can provide the motorcycle 1 including the battery arrangement structure 100A in which, by providing the battery arrangement structure 100A, the feasibility of layout with peripheral components can be satisfied while the front case 103 and the rear battery 102 can be protected.

In the above embodiment, the rear extension portions 172 are disposed below the front battery 101 and the rear battery 102, thereby contributing to layout characteristics of the power unit 10.

In the above embodiment, the lower end portion of the rear battery 102 is disposed above the lower end portion of the front battery 101, thereby contributing to layout characteristics of the power unit 10.

Although an example in which the battery arrangement structure includes two unit batteries has been described in the above embodiment, the present invention is not limited thereto. For example, the battery arrangement structure may include one unit battery or three or more unit batteries.

Although an example in which only a left side of the fender has a cantilevered structure fixed to the fender stay has been described in the above embodiment, the present invention is not limited thereto. For example, a cantilevered structure in which only a right side of the fender is fixed may be used. Alternatively, the fender may have a double-sided structure in which the left and right sides thereof are fixed.

The present invention is not limited to the above embodiment and all vehicles in which a driver straddles and rides a vehicle body are included in the saddle-riding type vehicle, and not only motorcycles (including motor-driven bicycles and scooter type vehicles) but three-wheel vehicles (including two-front-wheel and one-rear-wheel vehicles in addition to one-front-wheel and two-rear-wheel vehicles) or four-wheel vehicles are also included therein.

Also, the configuration in the above embodiment is an example of the present invention, and various changes can be made without departing from the gist of the present invention, such as replacing the components of the embodiment with known components.

REFERENCE SIGNS LIST

1 Motorcycle (saddle-riding type vehicle)
10 Power unit
15 Rear upper frame (second rear frame)
15e Upper edge of rear upper frame (Upper edge of second rear frame)
16 Rear lower frame (third rear frame)
100 Battery
100A Battery arrangement structure
101 Front battery (second battery)
102 Rear battery (battery)
103 Front case (accommodating section)
108 Battery-supporting portion
140 Rear frame
145 Rear frame portion (first rear frame)
151 Rear upper front half portion (front extension portion)
172 Rear extension portion
173 Power unit-supporting portion
189 Pivot shaft
H1 Lower rear end of front case (accommodating section)
H2 Lower rear end of rear battery (battery)
H4·Upper front end of rear battery (battery)
H5·Upper rear end of rear battery (battery)

What is claim is:

1. A battery arrangement structure comprising:
a pair of left and right rear frames disposed in a rear section of a vehicle; and
a battery disposed between the pair of left and right rear frames,
wherein the pair of left and right rear frames include a pair of left and right first rear frames extending upward from a lower portion of the vehicle, and a pair of left and right second rear frames extending rearward from upper end portions of the pair of left and right first rear frames,
the battery arrangement structure further includes a pair of left and right rear extension portions extending rearward from lower sides of the pair of left and right first rear frames, and an accommodating section disposed between the pair of left and right first rear frames,
a power unit-supporting portion which swingably supports a power unit is provided at rear portions of the pair of left and right rear extension portions, and the battery is disposed between the pair of left and right second rear frames and above the power unit-supporting portion,
the battery arrangement structure further comprises a pair of left and right battery-supporting portions extending rearward from lower portions of the pair of left and right first rear frames, wherein the pair of left and right battery-supporting portions are disposed below the accommodating section and the battery, and
the battery-supporting portions are disposed between the battery and rear extension portions in a vertical direction.

2. The battery arrangement structure according to claim 1, wherein the pair of left and right rear frames further include a pair of left and right third rear frames extending rearward from vertically intermediate portions of the pair of left and right first rear frames,
the pair of left and right second rear frames overlap an upper portion of the accommodating section and an upper portion of the battery in a side view, and
the pair of left and right third rear frames overlap a vertically intermediate portion of the accommodating section and a vertically intermediate portion of the battery in a side view.

3. The battery arrangement structure according to claim 1, wherein the pair of left and right second rear frames include front extension portions extending forward from upper end portions of the pair of left and right first rear frames, and
the front extension portions overlap the vertically intermediate portion of the accommodating section in a side view.

4. The battery arrangement structure according to claim 1, wherein the pair of left and right first rear frames overlap a rear portion of the accommodating section from a lower portion to an upper portion of the accommodating section in a side view.

5. The battery arrangement structure according to claim 1, wherein a pivot shaft extending in a vehicle width direction is provided in the power unit-supporting portion, and
the accommodating section and the battery are disposed inward in the vehicle width direction from both ends of the pivot shaft.

6. The battery arrangement structure according to claim 1, further comprising a second battery positioned in front of the battery, wherein the accommodating section is a battery-accommodating section which accommodates the second battery.

7. The battery arrangement structure according to claim 1, further comprising a second battery positioned in front of the battery, wherein the battery and the second battery are mobile batteries that are detachable from the vehicle.

8. A saddle-riding type vehicle, comprising the battery arrangement structure according to claim 1.

9. The battery arrangement structure according to claim 1, wherein the accommodating section and the battery are obliquely disposed to be positioned further rearward as they go upward in a side view.

10. The battery arrangement structure according to claim 9,
wherein a lower rear end of the battery is disposed above a lower rear end of the accommodating section in a side view, and
an upper rear end of the battery is disposed below upper edges of the second rear frames in a side view.

11. The battery arrangement structure according to claim 10, wherein an upper front end of the battery is disposed below the upper edges of the second rear frames in a side view.

12. A battery arrangement structure comprising:
a pair of left and right rear frames disposed in a rear section of a vehicle; and
a battery disposed between the pair of left and right rear frames, wherein the pair of left and right rear frames include a pair of left and right first rear frames extending upward from a lower portion of the vehicle, and a pair of left and right second rear frames extending rearward from upper end portions of the pair of left and right first rear frames, the battery arrangement structure further includes a pair of left and right rear extension portions extending rearward from lower sides of the pair of left and right first rear frames, and an accommodating section disposed between the pair of left and right first rear frames, a power unit-supporting portion which swingably supports a power unit is provided at rear portions of the pair of left and right rear extension portions, the battery is disposed between the pair of left and right second rear frames and above the power unit-supporting portion, the battery arrangement structure further comprises a pair of left and right battery-supporting portions extending rearward from lower portions of the pair of left and right first rear frames, the pair of left and right battery-supporting portions are disposed below the accommodating section and the battery, the pair of left and right second rear frames include front extension portions extending forward from upper end portions of the pair of left and right first rear frames, and the front extension portions overlap the vertically intermediate portion of the accommodating section in a side view.

* * * * *